United States Patent
Marggraff et al.

(10) Patent No.: US 8,427,344 B2
(45) Date of Patent: Apr. 23, 2013

(54) SYSTEM AND METHOD FOR RECALLING MEDIA

(75) Inventors: James Marggraff, Lafayette, CA (US); Tracy L. Edgecomb, Berkeley, CA (US); Gabriel Acosta-Mikulasek, Livermore, CA (US); Dan Gärdenfors, Malmö (SE); Anders Svensson, Södra Sandby (SE)

(73) Assignee: Anoto AB, Lund (SE)

( * ) Notice: Subject to any disclaimer, the term of this patent is extended or adjusted under 35 U.S.C. 154(b) by 908 days.

(21) Appl. No.: 12/302,985

(22) PCT Filed: Jun. 1, 2007

(86) PCT No.: PCT/EP2007/055385
§ 371 (c)(1),
(2), (4) Date: Aug. 28, 2009

(87) PCT Pub. No.: WO2007/141204
PCT Pub. Date: Dec. 13, 2007

(65) Prior Publication Data
US 2010/0039296 A1    Feb. 18, 2010

Related U.S. Application Data

(60) Provisional application No. 60/810,178, filed on Jun. 2, 2006.

(51) Int. Cl.
*H03K 17/94*    (2006.01)
(52) U.S. Cl.
USPC ............. 341/20; 382/119; 382/179; 382/187
(58) Field of Classification Search ...................... 341/20
See application file for complete search history.

(56) References Cited

U.S. PATENT DOCUMENTS 5,818,436 A    10/1998    Imai et al.
6,215,901 B1 *    4/2001    Schwartz ...................... 382/186
(Continued)

FOREIGN PATENT DOCUMENTS

WO    WO 2006/049573 A1    5/2006
WO    WO 2006/049574 A1    5/2006

OTHER PUBLICATIONS

Chiu, et al., "A Dynamic Grouping Technique for Ink and Audio Notes", UIST '98, XP-002279001, pp. 195-202, (1998).

(Continued)

*Primary Examiner* — Khai M Nguyen
(74) *Attorney, Agent, or Firm* — Finnegan, Henderson, Farabow, Garrett, & Dunner, LLP

(57) ABSTRACT

Paper-based playback of media can be performed by electronically recording handwritten notes including pen strokes using a digital pen on a position-coded paper. A plurality of bounding areas is identified, e.g. by generating bounding areas around the pen strokes as they are developed. Each bounding box is provided with a time stamp which indexes a media file, which was recorded simultaneously with the handwritten notes. By placing the digital pen close to a handwritten note on the paper, the part of the media that was recorded when the specific note was written can be recalled. More specifically, the bounding box corresponding to the position of the digital pen is identified and the associated time stamp is used to find the media to recall. This paper-based playback of media can be performed in e.g. a stand-alone device or by a combination of a digital pen and a mobile phone.

30 Claims, 19 Drawing Sheets

U.S. PATENT DOCUMENTS

| | | | |
|---|---|---|---|
| 6,275,611 B1 * | 8/2001 | Parthasarathy | 382/187 |
| 6,529,920 B1 | 3/2003 | Arons et al. | |
| 6,663,008 B1 | 12/2003 | Pettersson et al. | |
| 6,667,695 B2 | 12/2003 | Pettersson et al. | |
| 6,788,982 B1 | 9/2004 | Lapstun et al. | |
| 6,952,497 B1 * | 10/2005 | Hollstrom et al. | 382/188 |
| 7,260,257 B2 * | 8/2007 | Zhang et al. | 382/165 |
| 2003/0023644 A1 | 1/2003 | Bryborn et al. | |
| 2003/0061188 A1 | 3/2003 | Wiebe et al. | |
| 2004/0229195 A1 | 11/2004 | Marggraff et al. | |
| 2005/0125717 A1 | 6/2005 | Segal et al. | |
| 2005/0289453 A1 | 12/2005 | Segal et al. | |
| 2006/0080608 A1 | 4/2006 | Marggraff et al. | |
| 2009/0002345 A1 * | 1/2009 | Burstrom | 345/179 |

OTHER PUBLICATIONS

Stifelman, et al., "The Audio Notebook, Paper and Pen Interaction with Structured Speech", CHI 2001, vol. No. 3, Issue No. 1, pp. 182-189, (2001).

Stifelman, "The Audio Notebook, Paper an Pen Interaction with Structured Speech", PhD Thesis, Massachusetts Institute of Technology, pp. 1-150, (Sep. 1997).

Stifelman, "Augmenting Real-World Objects: A Paper-Based Audio Notebook", Speech Research Group, MIT Media Laboratory, CHI 96 Electronic Proceedings, pp. 1-4, (Apr. 12, 2006).

Stifelman, et al., "VoiceNotes: A Speech Interface for a Hand-Held Voice Notetaker", Proceedings of Interchi, pp. 179-186, (Apr. 24-29, 1993).

* cited by examiner

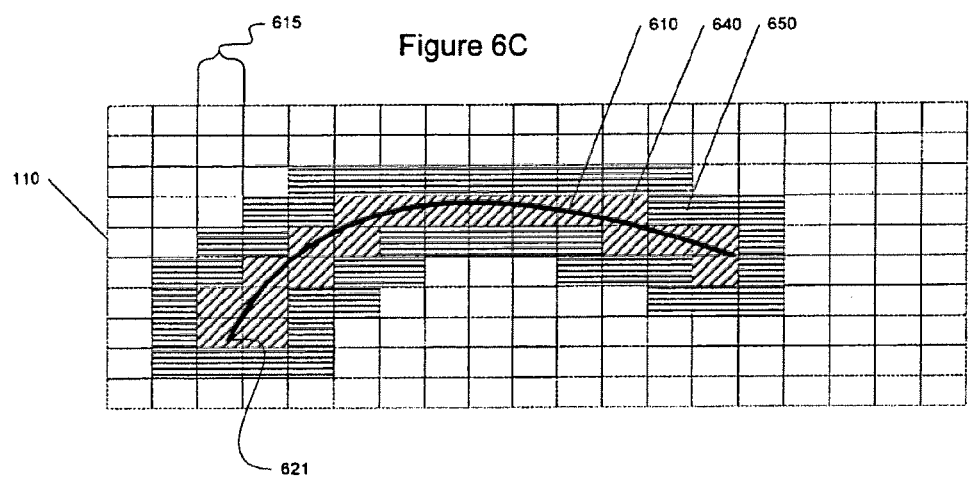
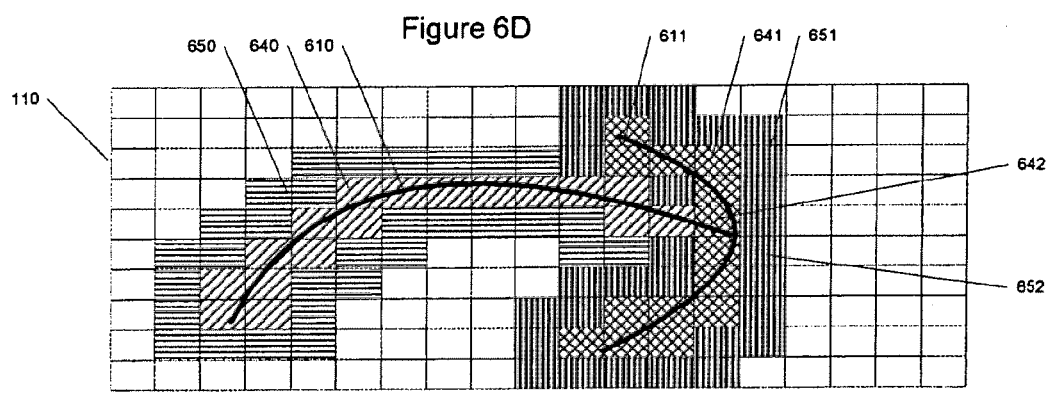

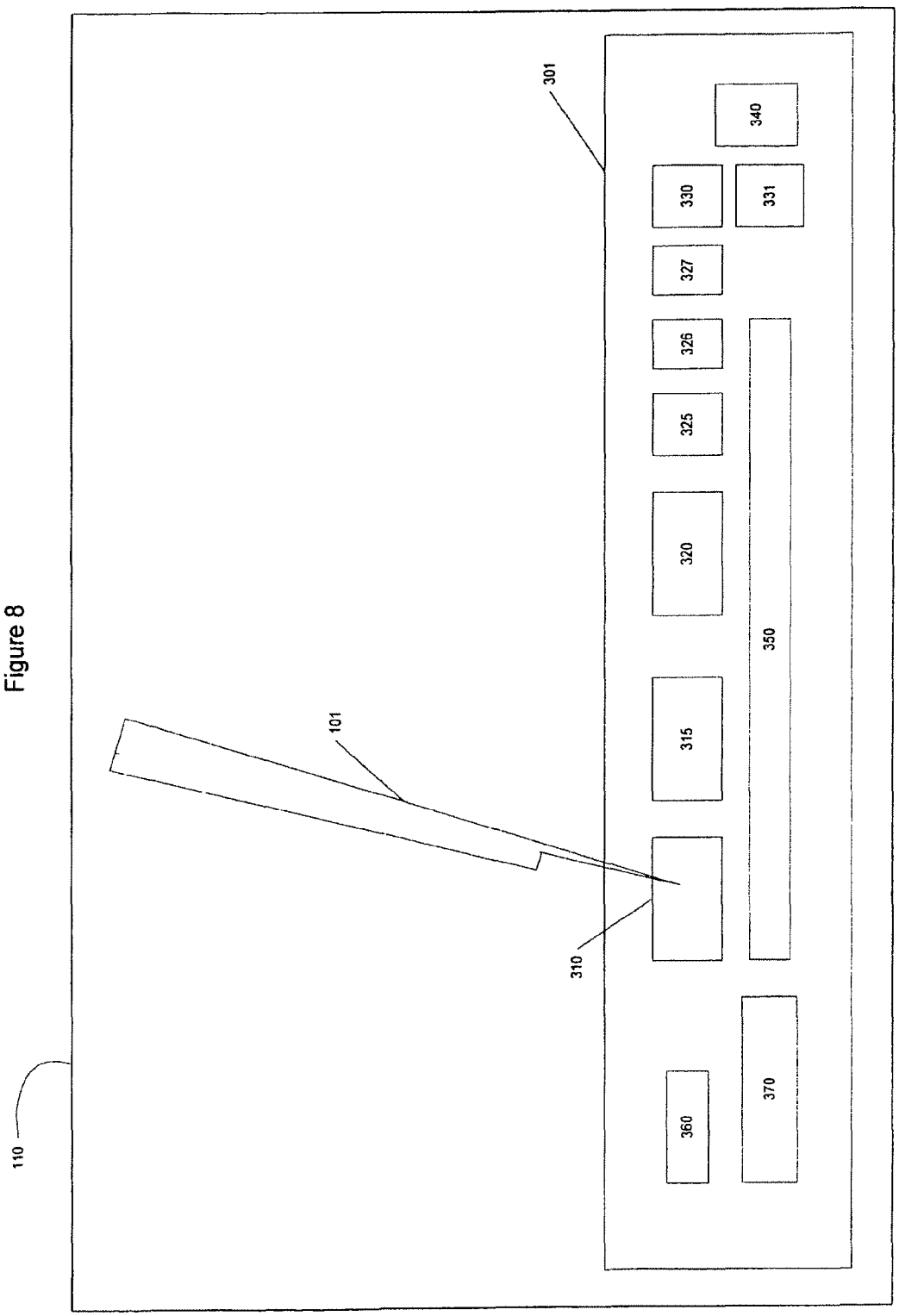

Color coordinating of information leads to very unusual results when bending production values beyond the isometric value of the boudary layer. Therefore one need not consider the valuation number associated with the regular step function intensity. —43

42

Values associated with triangular wheel axles result in lost production. Therefore, round axles are considered the better choice. —41

The test is next Tuesday. It will be open book. Lecture Hall 2C review Sunday afternoon. 1 hour, open questions.

Triangular axles will definately be on the exam. Consider 3x value is critical to solution. Do not forget to multiply by three! Otherwise skewed results! —45

42

47

Color coordinating must be performed without bent values. Do not color coordinate and bend. —42

CALC :

NOTEPAD :

CONTACTS
GAME
CALC

FIG. 19
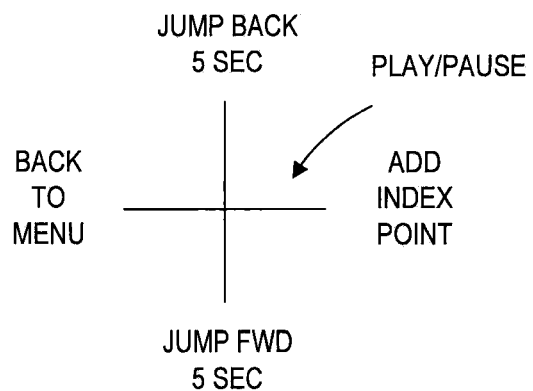

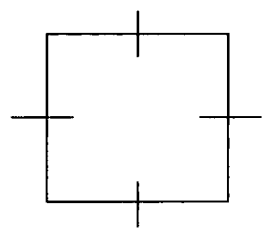
FIG. 20C

SYSTEM AND METHOD FOR RECALLING MEDIA

CROSS-REFERENCE TO RELATED APPLICATIONS

The present application claims the benefit of U.S. provisional patent application No. 60/810,178 filed on Jun. 2, 2006, which is hereby incorporated by reference.

FIELD OF THE INVENTION

This invention generally relates to methods and systems for linking information reflected in differing media. The invention may be used, for example, for linking handwritten or typewritten notations with a simultaneous, prior, or subsequent audio or video recording.

DISCUSSION OF RELATED ART

Information is commonly stored in a variety of mediums. For example, users may record information on paper using a conventional pen or pencil, enter information into electronic-based media using a keyboard, mouse, tablet or other tactile device, or record audio or video on a variety of analogue or digital media.

Relatively recent technology allows users to electronically record ordinary handwriting made on a paper so that it can be stored into electronic-based media. Such electronic recording can for instance be carried out using an optical pen that captures successive images of a surface in the proximity to the pen tip. One such type of optical pen is used with an encoded sheet of paper in which the encoding consists of very small, printed dots, forming a unique pattern on the sheet of paper. By interpreting the dot pattern in each captured image, a processor within the pen can determine the location on the page corresponding to the pen tip, thereby generating an electronic representation of the movement of the pen tip.

At the same time notes are taken whether using a digital pen, PC, tablet, or other input device, simultaneous information may be generated related to the notes. For example, an audio or video recording may correlate to the notes. Alternatively, the notes may correlate to information generated before or after note taking. When such correlations exist, there may be an interest in linking the two sets of information so that access to one will enable access to the other, regardless of whether the other shares the same form or stored location.

U.S. Pat. No. 6,529,920 discloses a multimedia linking device which automatically links user notations, e.g. handwritten notes, made on a page to time-varying data, e.g. audio. Consequently, a user can take notes while observing a multimedia presentation, for example, and later review the notes and the corresponding segments of the recorded multimedia presentation. The device comprises a digitizing tablet on which a note book is placed when notes are to be recorded, a stylus for writing on the pages of the note book, a microphone for recording audio, and a speaker for outputting audio during play-back. The device records the notes in the form of X-Y locations, each of which acts as an index into the audio recording.

SUMMARY OF THE INVENTION

According to one aspect of the invention, a method for recalling media based on handwritten notes comprises electronically recording handwritten notes made on a surface, said handwritten notes comprising at least one pen stroke which is recorded as a series of position indications; identifying a plurality of bounding areas on the surface, each of said bounding areas including at least a part of said at least one pen stroke; electronically recording a further position indication relating to the handwritten notes when media is to be recalled; determining with which bounding area said position indication is associated, and recalling a part of previously stored media, said part being selected based on the bounding area with which said position indication is associated.

By identifying bounding areas on the surface and recalling media based on the bounding areas, memory may be conserved. Also play-back may be more intuitive to the user.

In one embodiment the bounding areas may be dynamically defined as the pen stroke is developed. Each bounding area may be expanded e.g. until it has reached a predetermined size and/or during a predetermined time period. Further criteria may be applied to avoid including empty parts of the surface in the bounding areas and to make the bounding areas and consequently the recall of media intuitive to the user.

In another embodiment, the bounding areas may be predetermined and fixed in relation to the surface. This embodiment may involve less processing relating to the creation of the bounding areas, but a larger number of bounding areas may need to be stored.

According to another aspect of the invention, a system for recalling media based on handwritten notes comprises a stylus having a distal end for retaining a marking element adapted to make marks on a surface; a sensor, configured to detect positions of the marking element of the stylus relative to the surface as the marking element marks the surface and to generate position indications reflective of positions of the marking element relative to the surface; a processor, which is configured to identify a plurality of bounding areas on the surface based on position indications generated by the sensor when handwritten notes are made on the surface, said handwritten notes comprising at least one pen stroke and each of said bounding areas including at least a part of said at least one pen stroke; said processor being further configured to receive a further position indication when media is to be recalled, to determine to which bounding area said position indication belongs, and to recall a part of previously stored media based on the bounding area with which said position indication is associated.

The system may be implemented in a single device, like a pen-top computer, or in a plurality of devices, like a digital pen and a mobile phone.

According to yet another aspect, the invention involves a system for recalling media based on handwritten notes, comprising a stylus having a distal end for retaining a marking element adapted to make marks on a surface; a sensor, configured to detect positions of the marking element of the stylus relative to the surface as the marking element marks the surface and to generate position indications reflective of positions of the marking element relative to the surface; a mobile phone comprising a processor, which is configured to receive position indications generated by the sensor when handwritten notes are made on the surface, said handwritten notes comprising at least one pen stroke and each of said bounding areas including at least a part of said at least one pen stroke; said processor being further configured to receive a further position indication when media is to be recalled and to recall a part of previously stored media which is correlated to the received position indication.

According to one more aspect, the invention involves a method for recalling media based on handwritten notes, comprising storing an indication of the locations of a plurality of bounding areas on a surface, each bounding area indicating a part of a surface that was touched by a pen stroke when said handwritten notes were made on the surface; storing media which relate to said handwritten notes; receiving a position indication relating to the handwritten notes when media is to be recalled; determining with which bounding area said position indication is associated; and recalling a part of the previously stored media, said part being selected based on the bounding area with which said position indication is associated.

BRIEF DESCRIPTION OF THE DRAWINGS

FIGS. 6A-6E depict various exemplary mechanisms for capturing locations of pen strokes, consistent with the invention.

FIG. 8 illustrates a printed control area which may be used in connection with the invention.

FIG. 10 depicts an exemplary use of a data tag.

FIGS. 17-19 show three exemplary layouts of control icons within the Paper Replay™ application.

FIGS. 20A-C show alternate shapes of control icons.

DETAILED DESCRIPTION

Reference will now be made in detail to exemplary embodiments of the present invention as illustrated in the accompanying drawings. Wherever possible, the same reference numbers are used throughout the drawings to refer to the same or like parts.

1.0 Exemplary System Overview

Figure 1:
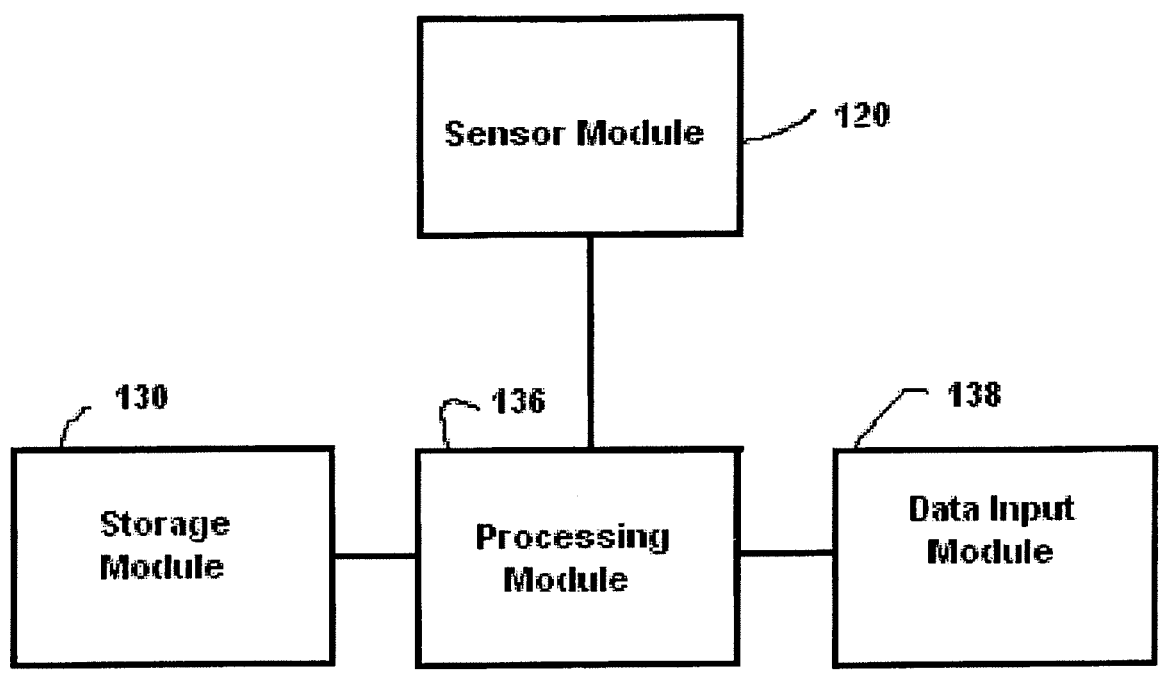
FIG. 1 is a general system diagram showing one embodiment of the present invention.

In a general sense, the invention may involve the components illustrated in FIG. 1. Namely, a sensor module 120 may output information to a processing module 136. The processing module 136, might also receive information (such as, for example, recorded audio or video) from data input module 138. The processing module might then link together the information from the sensor module 120 with the information from the data input module 138 so that access to one type of information will provide related access to the other. If the invention is embodied in or used with a system involving a digital pen, the pen may have components corresponding to those generally depicted in FIGS. 2A and 2B.

1.1 Exemplary Stylus Description

In accordance with the invention there may be provided a stylus having a distal end for retaining a marking element adapted to make marks on a surface. By way of example and with reference to FIG. 2A, the stylus may be a digital pen 101 having a distal end 102 for retaining a marking element 104. Marking element 104 may be adapted to make marks on surface 110. The stylus need not be of any particular shape or proportion nor must it be used in connection with any particular sensing mechanism, so long as it is capable of being manipulated by the hand of the user. The marking element 104 of the invention may leave either a visible mark on surface 110 or may cause a mark to be formed in an electronic file without leaving a visible mark on surface 110. If marking element 104 is adapted to leave a visible mark, it may contain structure such as, but not limited to, an ink cartridge, roller ball, a pencil, a felt tip cartridge, or any other component capable of causing a visible mark on surface 110. As used herein, the term "digital pen" refers to styli regardless of whether adapted to leave a physical mark.

Digital pen 101 may further comprise a contact sensor, which may be operatively connected to the marking element 104 to detect when the pen is applied to (pen down) and/or lifted from (pen up) surface 110, and optionally to allow for determination of the application force. By using signals from the contact sensor, processing module 136 or another appropriate device to which the signals are sent may recognize when the user taps one or more times on the surface by digital pen 101. The recognition of a tap may for instance be at least partly based on the time period between a pen down and a pen up event. In another embodiment it may at least partly be based on application force. Digital pen 101 may include internal timing circuits, which may be used for e.g. time-stamping position data or for determine time periods, such as an elapsed time between a pen down and a pen up event. Also, a pen stroke may be defined by a pen down and the next pen up.

1.2 Exemplary Sensor Description

In accordance with the invention, there may also be provided a sensor configured to detect positions of the distal end of the stylus relative to the surface as a marking element is moved relative to a surface, and to generate location signals or position indications reflective of positions of the marking element relative to the surface. As embodied herein, the sensor may be a CCD or CMOS sensor 121 or other type of 2D radiation sensor which may be part of or associated with sensor module 120. CMOS sensor 121 may be contained completely or partially within the housing of a stylus such as digital pen 101, and may be used to image physical markings made by the digital pen 101 or to localize the marking element 104 relative to surface 110. Regardless of configuration, in connection with embodiments of the invention that employ optical imaging, term "sensor" may include one or more of a detector such as a CMOS sensor 121 or other camera-like device, as well as other components associated with the detector for generating image information. Thus, in FIG. 2A, sensor module 120 should be understood to include a detector together with portions of a processor which may be required to generate location signals or position indications, such as x-y coordinates, regardless of whether the processor is specifically dedicated to the sensing module or may perform other functions as well.

As an alternative to a system which includes an optical sensor, the invention may be embodied in a system that employs an electromagnetic, magnetic, infrared, radio frequency, piezo-electric, thermal, electromechanical or other type of sensor for localizing marking element 104. Thus, regardless of the technology used for the sensor, in its broadest sense the invention is not limited to any specific sensing technology, but extends to any mechanism capable of generating signals that reflect the positions of the distal end of the stylus relative to the surface.

For exemplary purposes only, when the invention is described herein in connection with an optical sensor, it is often described in connection with technology provided through Anoto AB. (See www. Anoto.com). Although so described, the invention is not limited to the Anoto technology, nor is it limited to digital pens in general. Rather, the invention, in its broadest sense, may involve any form of digital pen or other device provided with the capability of capturing and/or recording information, and/or playing back previously recorded information. For example, the invention may involve any portable or non-portable equipment, such as a PDA, cell phone, portable audio player/recorder, MP3 player, scanner, tablet, video display, computer display, or other hand-held mechanisms.

1.3 Exemplary Memory Location Description

The invention may further include a memory location for storing information. As embodied herein, the memory location may include storage module 130, which may act as a repository in which data from the sensor module 120, the data input module 138, and/or operating parameters are stored. Storage module 130 may include a random access memory (RAM), a read only memory (ROM), a programmable read-only memory (PROM), a field programmable read-only memory (FPROM), a Flash memory or other dynamic storage device for storing data.

1.4 Exemplary Data Input Module Description

One or more of digital pen 101 and separate device 150 (see FIG. 2B) may include a data input module 138. By way of example only, data input module 138 may include or be associated with a media recorder, such as audio recorder 135 and microphone 137. Data such as sound or video captured using data input module 138 may be stored in storage module 130 for later recall. Data input module may in addition or alternatively include a communications interface, enabling downloading or receipt of data, e.g. linked data sets, from other units. Furthermore, data input module may additionally or alternatively include a replaceable memory unit, such as an SD card, so that data, such as linked data sets, can be furnished to digital pen 101 and/or separate device 150.

The media recorder may be any device or component capable of recording data. It may include one or more of a microphone or other audio recording device, a video recording device, a presentation recording device, or a device capable of recording timing of data. The media recorder may itself be capable of sending and receiving data directly or indirectly via wired and wireless connections such as those previously discussed.

1.5 Exemplary Processor Description

Figure 2A:
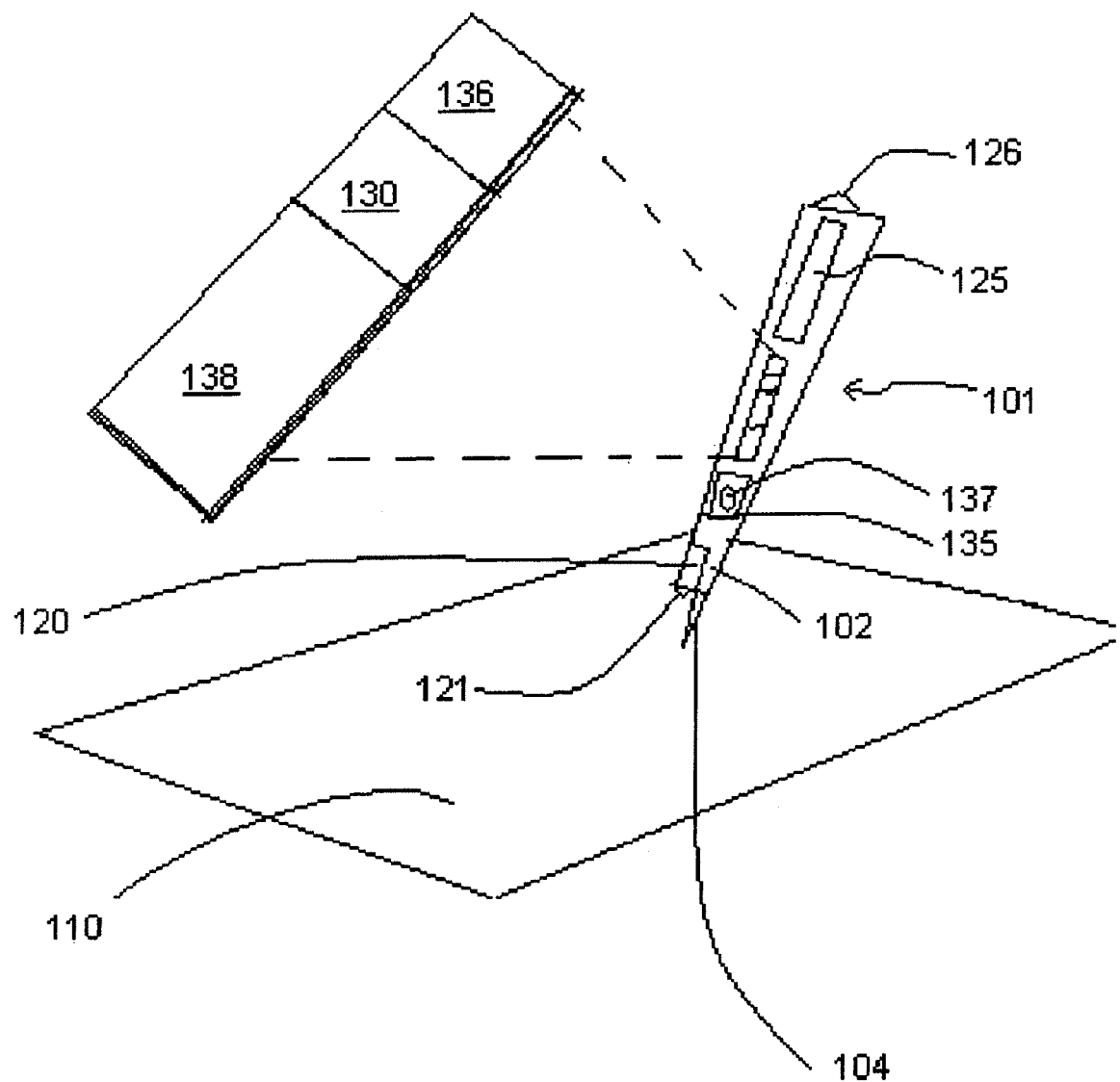
FIG. 2A depicts one embodiment of a digital pen which may be used in connection with the invention.
Figure 2B:
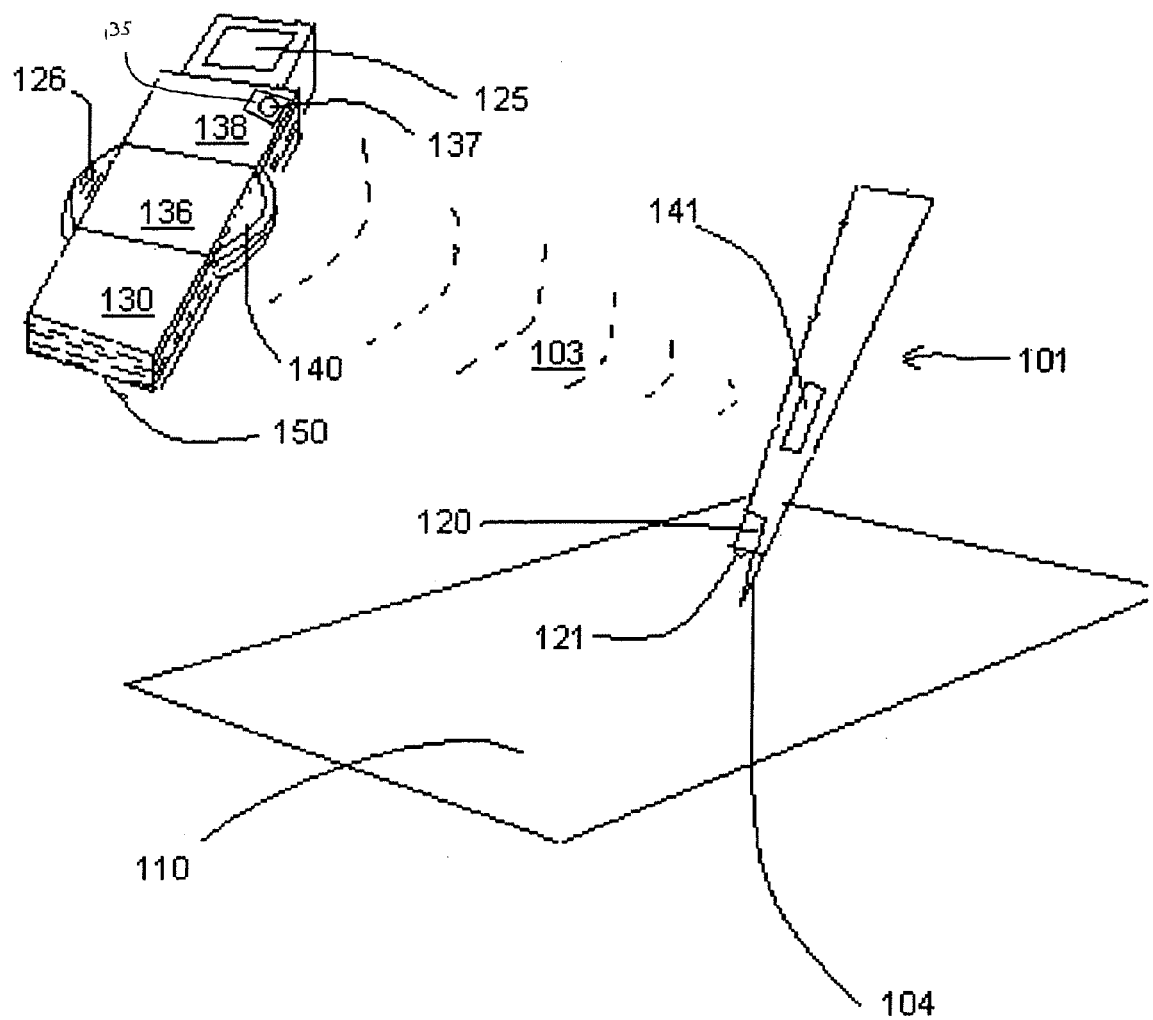
FIG. 2B depicts one embodiment of a pen used in combination with a separate device, consistent with the invention.

The invention may also include a processor for performing one or more functions, as described later in greater detail. The processor may be part of processing module 136, which, as illustrated in FIGS. 2A and 2B may be part of digital pen 101 and/or a separate device 150. For example, digital pen 101 may be provided with limited processing power but may include a wired or wireless connection 103 to a separate device 150, generically illustrated in FIG. 2B, in which functionality may occur.

As is described later in greater detail, processing module 136 may correlate or link data obtained by data input module 138 with position data sensed by sensor module 120. Those correlations may also be stored in storage module 130. Correlations between data and position may comprise arrays of pointers into a continuous stream of data; key-value pairs; paired values of positions and data; or any other appropriate indicators of matched positions and data.

Processing module 136 may include one or more processors. Each processor may be on the same device or may be on separate devices. Processing module 136 may include one or more of a field programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of processing module 136.

1.6 Exemplary System Configuration Involving Multiple Devices

While one embodiment of the invention includes the various separate modules contained in a single housing as depicted in FIG. 2A, the invention is not so limited. Portions of functionality of any disclosed module may be divvied between multiple devices. Likewise, the functionality of multiple described modules may be combined into a single module, or described functions may be further parsed into even more discrete modules.

By way of example, functionality may be outsourced to separate device 150. Separate device 150 may be a mobile and/or handheld unit such as a PDA, mobile phone, video recorder, audio recorder, mobile personal computer, or MP3 player; or may be a non-portable device such as a personal computer or network in which some or most of the various described functions are accomplished.

Separate device 150 might include one or more of data input module 138 (with associated or separate audio recorder 135 having microphone 137), processing module 136, and storage module 130. A communication module 140 included within separate device 150 might provide either a wired or wireless connection 103 to communication module 141 in digital pen 101. Communication modules 140 and 141 may include a light emitting diode ("LED") for emissions and a photodiode for receiving communication in the infrared spectrum, the operation of the LED and photodiode possibly conforming to the Infrared Data Association standard. Alternatively, communication modules 140 and 141 may communicate through other wired or wireless mechanisms. Examples of wireless mechanism include BLUETOOTH™, WIFI, infrared, radio frequency protocol, or other "over the air" communication channels. "Wired" connections may include all forms of physical connections whether through wire, cables or fiber optics. In addition, communication modules 140 and 141 may communicate acoustically, electromagnetically, through light waves such as lasers, or through radiowave or infra-red protocols. While communication modules 140 and 141 may directly communicate with each other, they may also do so indirectly through one or more networks or other intermediary devices.

Audio captured in separate device 150 can be stored and either simultaneously or later linked to the data recorded in sensing module 120. Because of the ubiquitous nature of mobile phones with Bluetooth™ or other connectivity capability, audio/video recording capability, and significant internal processing power, a combination of a compact data streaming digital pen and mobile phone may be a particularly attractive embodiment of the invention from both a cost and efficiency standpoint.

Regardless of the particular hardware configuration, one or more audio speakers 126 may be included in digital pen 101 or in the separate device 150 to provide audio feedback to the user. The speaker(s) 126 may be used for playback, to provide speech simulation of handwriting, to facilitate control operations, or to facilitate any other user feedback. Speaker(s) may include one or more of an integrated speaker, an earplug and a headset.

Also regardless of hardware configuration, digital pen 101 and/or separate device 150 may include one or more processing modules 136. One or both of digital pen 101 and separate device 150 may comprise two or more processing modules 136, each of processing modules 136 performing some or all of the functions described herein.

Separate device 150 may include one or more of a video recorder and an audio recorder. Data input module 138 in separate device 150 may receive presentation information including timing information for permitting correlation with other forms of data. In this manner, notes taken with digital pen 101 may be correlated to video media. In addition to video, video media may include presentation slides, such as Adobe Acrobat slides or Microsoft PowerPoint slides. One or more of the audio, video, and presentation information may be received and correlated by processing module 136, or another processor (not pictured), with those correlations being stored in storage module 130.

Although the embodiments of FIGS. 2A and 2B respectively illustrate a majority of functionality in either digital pen 101 or separate device 150, the invention in a broader sense may divvy functionality in many ways between digital pen 101 and one or more separate devices 150. For example, after processing is performed in separate device 150, processed information might be stored in digital pen 101, or vice versa. A majority of functionality may be performed in digital pen 101, with the separate device 150 serving primarily as an audio or video recorder. The communication modules 140 and 141 might also permit two-way communication so that the results of process performed by either unit might be transmitted for use or storage in the other unit. Although the figures illustrate examples where a single display 125 and a single audio output such as speaker 126 are included on either digital pen 101 or separate device 150, a display 125 and speaker 126 may be included in both devices. Indeed, each device may include some or most of the functionality of the other, or may split portions of functionality between themselves.

1.7 Exemplary Surface Description

As mentioned previously, although the invention in its broadest sense is not limited to a particular mechanism enabling the capture of markings with a digital pen (and is not even limited to the use of a digital pen) if a digital pen is used, one mechanism for localizing marking element 104 is through the use of a position-coding pattern on surface 110, which defines absolute positions on the surface 110. For example, each portion of a pattern having a given size may be unique and thereby define a unique, absolute position on surface 110. Alternatively, the surface may be tiled with pattern portions each defining a position. Pattern portions may be repeated as desired, depending on intended use.

Figure 3:
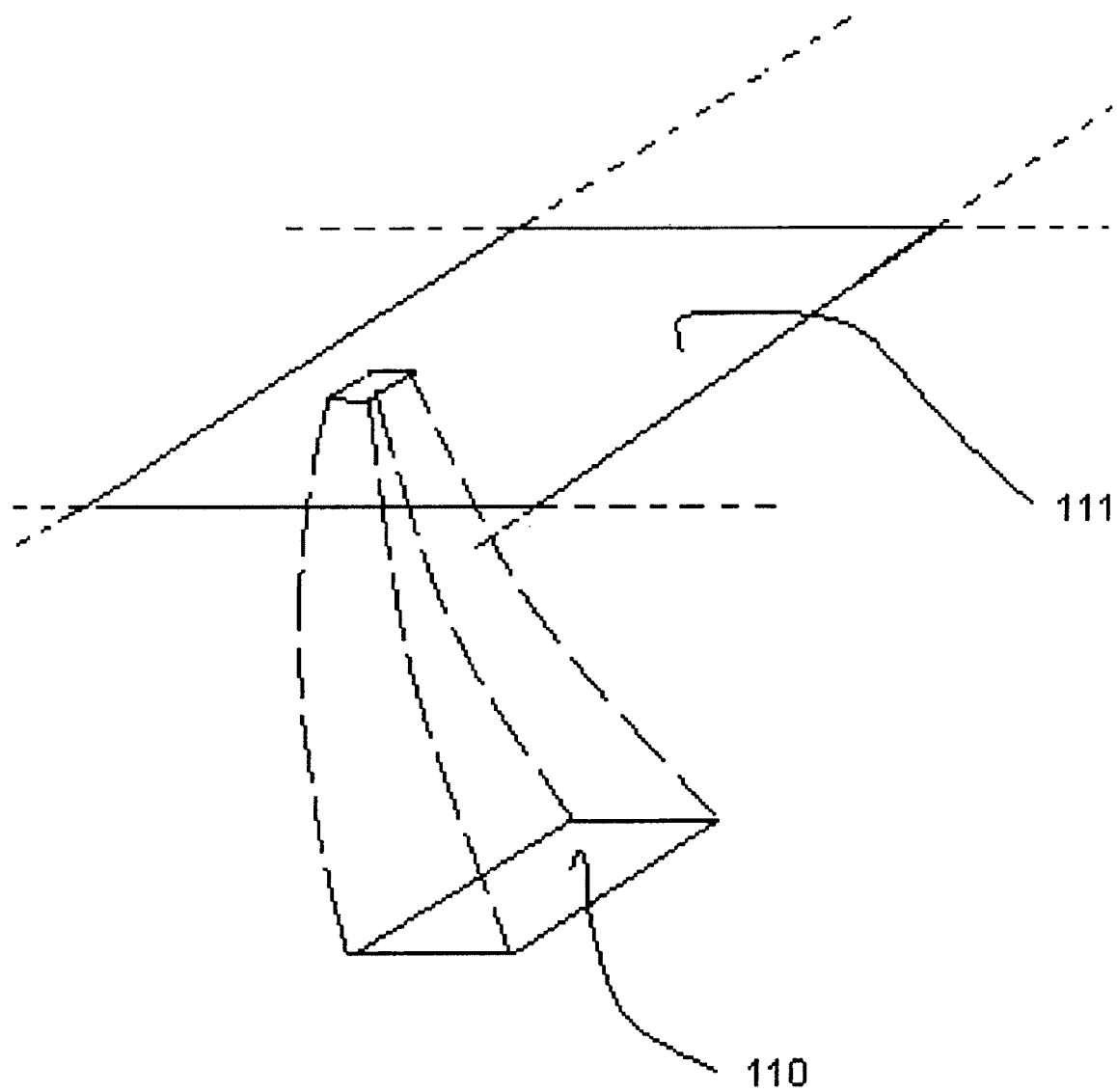
FIG. 3 depicts exemplary aspects of a surface which may be used in connection with the invention.

U.S. Pat. Nos. 6,663,008 and 6,667,695, which are both assigned to Anoto AB and which are both incorporated herein by reference, disclose a position-coding pattern of the first-mentioned type which could be used by a digital pen for electronic recording of handwriting. More particularly, the pattern described in the Anoto patents is built up by dots of similar size and shape. Any set of 6*6 dots, for example, define a unique position. As described in the incorporated patents, each dot encodes one of four possible values by being displaced in one of four predetermined directions from a grid point in a virtual square grid. The directions of displacements of the different dots are calculated according to a mathematical algorithm when the pattern is generated. Theoretically, $4^{36}$ different positions can be encoded in a pattern having the above-mentioned parameters. The pattern may be implemented with a nominal spacing between the grid points of approximately 0.3 mm, making the pattern suitable for recording handwriting with a high resolution. This pattern arrangement permits the total pattern to cover a surface area roughly equal to the surface area of Europe and Asia combined. Thus, as depicted in FIG. 3, only a tiny percentage or miniscule portion of the total pattern 111 need be provided on paper such as surface 110, in order to enable it for electronic recording of handwriting. Excerpts of the pattern may also reproduced within documents, publications or other printed or displayed matter, and may be included in all or a portion of a document. Thus, as described herein, reference to a pattern of the above-mentioned type, provided on a physical product, should thus be interpreted as referring to only a portion of the total pattern.

The total position-coding pattern disclosed in U.S. Pat. Nos. 6,663,008 and 6,667,695 may be logically subdivided into smaller parts, see U.S. Patent publication no. US2003/0061188, which is hereby incorporated by reference. Generally, the total pattern may be divided into a number of equally sized segments, each of which may be further divided into pages, where the pages within each segment may all be of equal size. Information about the subdivision of the pattern may be stored in a database in the digital pen as further described in PCT publication document no. WO2006/049574. When the pen decodes a position from a recorded image of a portion of the pattern, the position may be obtained as an x-y coordinate indicating the position in the total pattern 111 of the imaged pattern portion. The pen may then use the information about the logical subdivision of the pattern to convert the absolute x-y coordinate to a page identity, defining the page to which the absolute x-y coordinate belongs, and a local x-y coordinate on that page.

Other patterns may have the page identity (also called page address) and the local x-y coordinates coded directly into the pattern, e.g. in the form of tags which each codes the relevant page identity and a local x-y position.

Pattern 110 may be printed on paper stock, translucent material, or may be caused to appear on any surface or material upon which it may be affixed, displayed, or other recorded. For example, pattern may be displayed dynamically such as on a video screen, computer screen, via a projector, or using any other display device.

As an alternative to displaced dots, a pattern allowing recording of handwriting may comprise one or more of dots of different sizes, right angles, slashes, characters, patterns of colors or other printed shapes or indicia.

Also in accordance with the invention, surface 110 may contain no coding but rather may be adapted for use on a sensory tablet or with other mechanisms for localizing the marking element 104 relative to surface 110. To this end, electrical charges, magnetic fields, or other detectible indicia could also be used, consistent with the invention. In addition, surface 110 is not limited to paper stock. Rather, it could alternatively or additionally include a screen or other display.

In the broadest sense, surface 110 may be any material or location upon which a marking element is able to leave a visible mark or from which a marking element is able to cause an invisible electronic mark.

In one embodiment, digital pen 101 may determine its absolute position on a non-encoded surface 110 by imaging the whole surface or part thereof and calculating its position with the aid of one or more of edges of the surface, corners of the surface or features of the surface. In another embodiment, digital pen 101 may determine its position by triangulation. In yet another embodiment, the digital pen may include one or more accelerometers and/or gyroscopes. Combinations of different positioning technologies may also be used, e.g. a combination of technologies using absolute and relative positioning.

2.0 General Overview of Paper Replay™ Used with Pen-Phone Combination

According to one aspect of the invention, an exemplary mobile phone-pen embodiment of the invention is being developed by Anoto AB, and may be commercially made available under the name "Paper Replay™". As a short hand, the phone-pen combination is described herein as "mobile phone Paper Replay™". However, it should be understood that this is just one embodiment of a broader invention and both the Paper Replay™ concept and mobility may be achieved in a manner other than through phone-pen combination described. For instance, a pen top computer may be used to implement the Paper Replay concept.

Conceptually, with mobile phone Paper Replay™, digital pen 101 is used to make notations, while an audio recorder in the phone (generically illustrated in FIG. 2B as separate device 150) captures a contemporaneous audio record. The pen-written notations are indexed to the audio so that when a user places the pen tip near previously taken notes, the audio captured at the time of the notes is replayed through speaker 126 in the mobile phone. Thus, for example, a person reviewing notes of a seminar captured using Paper Replay™, might touch digital pen 101 to a particular passage of notes on surface 110, and thereby replay the precise audio that was captured at the time the passage of notes was written.

As generally depicted in FIG. 2B, Mobile Phone Paper Replay™ may be used with a streaming digital pen 101 which automatically streams coordinates recorded by digital pen 101 to a mobile phone (separate device 150) having audio recording and playback capabilities. For example, currently available Maxell PenIt pens and Nokia phones built on the Symbian S60 platform may be used in combination as part of the invention. In another embodiment the Paper Replay application may be built on a Java platform.

Digital pen 101 may alternatively be configured as a store-and-send device, which stores all recorded pen strokes until the user instructs the pen to transmit them to the mobile phone. e.g. by tapping a control area on surface 110 e.g. paper encoded with absolute coordinates, whereupon the pen sends the strokes (coordinates) wirelessly via, for example, Bluetooth™ to the mobile phone. When this kind of delayed transmission is employed, it might be beneficial to transmit the coordinates along with time-stamps reflecting when the coordinates were recorded by digital pen 101. Synchronization of notes and audio may occur by synchronizing a clock or timing circuit in the phone with a clock or timing circuit in the pen, so that audio and positions of concurrent hand-written notations share common time stamps. Such a clock or timing circuit may be part of or separate from processing module 136. In a streaming embodiment, position data may be time-stamped when received by the mobile phone. The timing information from a single timing circuit can thus be used for position data and audio data.

WO2006/049573, assigned to Anoto AB and incorporated herein by reference, discloses a digital pen which can be used in accordance with the invention for recording handwriting based on a position-coding pattern. The digital pen has an offline mode and an online (streaming) mode. In the offline mode, the pen stores pen strokes until a pen user initiates transfer of pen strokes to an external device, e.g. by making a mark in a predetermined area on a surface or by putting the pen in a cradle connected to the external device. In the online mode, the pen streams position data more or less in real time to an external device. When the processing of data capture device 101 is outsourced to a separate device 150, as in the embodiment illustrated in FIG. 2B, either an offline mode or a streaming mode as generally implemented in WO2006/049573 can be used for communicating position data to separate device 150. The position data may be time-stamped in the digital pen or in separate device 150.

In one embodiment, the Paper Replay™ system may be used with paper stock encoded with the Anoto dot pattern, previously described. The pattern may be printed in notebooks, loose paper, notepads, Post-It™ notes or on any other surface, regardless of form. If several pages are used, each page might beneficially include a unique position code so that different pages might be distinguished from each other.

The coordinates coded by the Anoto position code on surface 110 are absolute coordinates indicating unique positions in the total Anoto pattern. When the processing module 136 has decoded these absolute coordinates from the captured images of the position code on surface 110, processing module 136 may use information about the logical subdivision of the Anoto pattern to convert each absolute x,y coordinates to a page address and a local x,y coordinate on the specific page.

As illustrated in the embodiments of FIGS. 2A and 2B, digital pen 101 may use processing module 136 to determine position on surface 110 based on a pattern detected by a CMOS sensor 121 in sensing module 120, while simultaneously recording ambient or directed audio via a microphone 137 associated with data input module 138. Processing module 136 may correlate the audio information from data input module 138 with the position data from sensing module 120 and produce a correlated data set. Processing module 136 may store one or more of the location information determined from the encoding on surface 110 and the correlated data set in storage module 130. In some embodiments, for example, processing module 136 may use time as a parameter or index to correlate the audio information with the position data. For example, in embodiments in which processing module 136 determines position on surface 110, processing module 136 may obtain the time that it determined the position on surface 110. Using the time information, processing module 136 may time stamp this position, storing the results in storage module 130. Processing module 136 may be configured to generate an index for the audio information corresponding to the time stamp. Processing module 136 may be configured to permit the generation of multiple indices for a single audio file. Thus, indices created by processing module 136 may correspond to markings made with marking element 104 on one or more surfaces 110.

The mobile phone Paper Replay™ application can be controlled by using pidgets, on a paper, pidgets on a separate card, pidgets on the cover of a notebook or notepad, pidgets on a sticker fastened to the mobile phone and/or by menu selections using buttons on the mobile phone. A pidget may be a special portion of a coding pattern which is associated with a specific function.

If pidgets are used, the Paper Replay™ application in the mobile phone may contain information about which coordinates correspond to the different pidgets, so that the application is able to recognize when the pen has hit a pidget on the paper. Pidgets may be interpreted in digital pen 101 or in separate device 150, such as mobile phone. Pidgets may also be called "control areas" or "user control areas" or "paper control areas".

In the recording mode, the mobile phone may record audio by a microphone 137 (internal or plug-in) using recording APIs (Application Program Interface) of the Symbian platform. All audio information recorded from the time when the user indicates that recording should be started until he or she indicates that the recording should be stopped may be stored in an audio file according to one of the standard audio formats that are used in the phone. Recording may automatically occur every time notes are taken in the Paper Replay™ mode, or recording may occur only after manual activation by the user. Paper Replay™ mode may e.g. be entered by opening a Paper Replay application via mobile phone or digital pen, by using a "record" pidget, or by just starting to make notes on paper or part of a paper having pattern which is dedicated to Paper Replay application, so that when the mobile phone receives coordinates decoded from this paper, it could establish that they relate to a Paper Replay™ application.

In another embodiment, notes are not taken when recording audio from a live audio source, but when listening to a previously recorded speech, lecture or the like. In this embodiment the starting time of the audio recording may be synchronized with the timestamps of the notes, given that the audio and the notes were recorded at different times, or were taken at the same time from previously unsynchronized sources.

In still another embodiment, the audio is not recorded by the mobile phone, but recorded by another device. The audio file is sent out or downloaded to the phone later on. Thereafter, the notes are synchronized with the audio file in the phone.

More generally, the Paper Replay concept could be implemented with the component discussed in connection with FIG. 1 and for any type of media. The media may for instance be presentation slides, so that when the user places the digital pen close to a previously made note, the slide that was shown when the note was made is recalled and displayed to the user on a screen. In one embodiment Paper Replay is implemented in a stand-alone type of digital pen, such as the digital pen discussed in connection with FIG. 2A. Surface 110 may be encoded or non-encoded depending on the technology used for capturing notes. Notes should be interpreted broadly and could be defined by any single pen stroke or group of pen strokes made on a surface.

3.0 Exemplary Mechanisms Linking Information and Media

One way of linking coordinates to media involves time-stamping each or most of the x-y coordinates recorded by the pen and storing them in storage module 138. Each coordinate may then be used, via its time stamp, as an index into a media file so that the media that was recorded or presented simultaneously with the capture of a specific coordinate may be played back by once again capturing the specific coordinate. Alternatively, and to conserve memory, rather than storing each x-y coordinate, various alternative schemes can be used to define and store information about general regions associated with notes.

3.1 Bounding Boxes for Linking Notes and Recorded Media

One such alternative scheme involves defining bounding boxes (also called bounding areas) around handwritten strokes or notations or parts thereof. Rather than storing each pen location, the processing module 136 defines a box around each pen stroke or part thereof, and then only needs to store one or more sets of two box corners to define each stroke. Once the box is defined audio may be synchronized with the bounding box as opposed to individual x,y locations making up each stroke.

Bounding boxes may be generated by a bounding box software module in processing module 136 in digital pen 101 or separate device 150. Each bounding box may be defined by the minimum x, y coordinate and the maximum x, y coordinate received during a predetermined time period, such as 1 second. The first coordinate received by the module may be stored as a starting x, y coordinate and the time-stamp of this coordinate may be stored as the time-stamp of the current bounding box. The second coordinate received will define the current bounding box together with the first coordinate (diagonal corners of the rectangular bounding box). When the next coordinate is received the software module might then check if the next coordinate lies outside the bounding box and if so the bounding box can be expanded so that the new coordinate falls at the perimeter of the bounding box. The bounding box in this example is always defined by its max x, y coordinate and its min x, y coordinate. No other coordinates need to be saved. By dynamically increasing the size of the bounding box in this manner, while discarding all coordinates other than those defining the bounding box, memory is conserved. Also, play back is simplified since there are fewer indices into the audio file and may be perceived as more intuitive and easier to understand by a user. The amount of memory consumed by the bounding boxes is thus a function of the size of the bounding box. As size increases, memory consumption decreases as does resolution for determining where to start play back. After a predetermined time, the bounding box is stored together with the time-stamp of the first coordinate or another predetermined coordinate associated with the bounding box. At the same time the generation of a new bounding box is started. When the predetermined time is 1 second, resulting bounding boxes normally have a size of about 2-3 cm$^2$.

Alternatively, if the bounding box reaches a certain size (e.g., greater than 2 or 3 cm$^2$) before the predetermined time period (e.g. 1 s) ends, the bounding box may be stored and the generation of a new bounding box started. This is to avoid situations where rapid long strokes cause bounding boxes to grow exceedingly large.

Also, if a pen stroke is finished and a new pen stroke is started more than a predetermined distance from the previous pen stroke, the bounding box including the last part of the previous pen stroke may be stored, and a next bounding box initialized at the start of the following pen stroke. Alternatively, a bounding box may be stored and a next bounding box initialized if the time period between two received position indications exceeds a predetermined value. Other criteria can also be applied to avoid empty space in bounding boxes and to generate bounding boxes that are logical and intuitive to a user.

In one embodiment, storage module 130 in digital pen 101 or separate device 150 stores one catalogue for each page address. The catalogue stores one or more AES (Area Engine State) files with all the bounding boxes of that page in the form of the IDs of the boxes and the minimum and maximum x,y coordinates that define each box. The catalogue further stores one or more .dat files which associate each bounding box ID with a time stamp. Alternatively, the same information, possibly except for the ID.s, might be stored in a single file. The catalogue could also include a file storing all the strokes of that page (see below). The storage module may also store one or more audio files from one or more Paper Replay™ recording sessions, e.g. as .amr files. The page address catalogue includes information linking each bounding box to a particular audio file. (Strokes can have been made on one and the same page during different Paper Replay™ sessions.) The AES files, the .dat files, and the audio files may e.g. all have a file name that includes the date and the time at which the associated Paper Replay™ session started. In such a case all files associated with a specific Paper Replay™ session will have the same name. This makes it easy to find related files.

The Paper Replay™ files may be moved from the device(s) where they were first created to another device where they are stored so that the user can play back the media from that device.

In another embodiment, storage module 130 may store not only the coordinates defining the bounding boxes but all coordinates representing the pen strokes made on surface 110. This embodiment would make it possible to recreate or recall the notes written on the paper by printing them or by rendering the strokes on a display (the mobile phone's display or the display of another device). If the notes are printed together with position code on paper, the author of the notes may share them with a friend or colleague, who can play back the Paper Replay™ session associated with the notes, given that they may also receive access to a copy of the recorded audio of that session. This presupposes, however, that the position code printed together with the notes is the same (codes the same coordinates) as the position code on the paper where the notes were originally made, or that the new position code could be associated with the information stored during the original Paper Replay™ session. One alternative could be to copy the information in the different page address catalogues to a new set of catalogues corresponding to the page addresses of the position code on the print-out of the notes.

Handwritten notes can be recreated exactly as they are, or some kind of enhancement can be applied. For instance, if reprinting notes taken for Paper Replay™, it could be useful to visualize the time line, since the notes are used to index an audio recording. The time line could for example be visualized by rearranging the notes using the time-stamps so that it more clearly appears in which order the notes were written, or by drawing a time line in another color on top of the original notes. It could also be useful to apply handwriting recognition and convert handwritten text to printed text (character codes). This may help users that did not create the notes themselves to more easily read the notes when they are to use them for playing back media. Also the notes may be easier to handle by different software modules.

The Paper Replay™ concept could be used to prepare presentations. A sales person may for instance prepare a presentation by writing notes on a position-coded paper by means of a digital pen. The notes can be transferred to a presentation software in a separate computer. The software may include logic which generates bounding boxes around the notes based on predetermined criteria, such as the order in which different pen strokes were made or the distances or relations between single pen strokes or group of pen strokes or any combination of these and other criteria. All notes made on a line on the paper may e.g. be grouped together in one and the same bounding box. The handwritten notes and the bounding boxes generated by the software may be presented on a display for approval or editing. The sales person may later on show the presentation prepared on the paper by sequentially tapping on the paper close to the notes that are to be displayed or beamed onto a screen. The software may then identify the corresponding bounding boxes and sequentially present all notes belonging to the identified bounding boxes.

Instead of using the paper with the notes for controlling a presentation or playing back previously recorded audio or other media, the playback may be controlled from a screen that displays the notes as an image by using a mouse to point at notes on the screen. The position of the mouse on the screen is then transformed to a position on the paper, whereupon the relevant bounding box is identified and the associated media presented.

The Paper Replay™ concept could also be used to replay video recorded or presented during the taking of handwritten notes or to show presentation slides presented during the taking of handwritten notes.

Figure 6A:
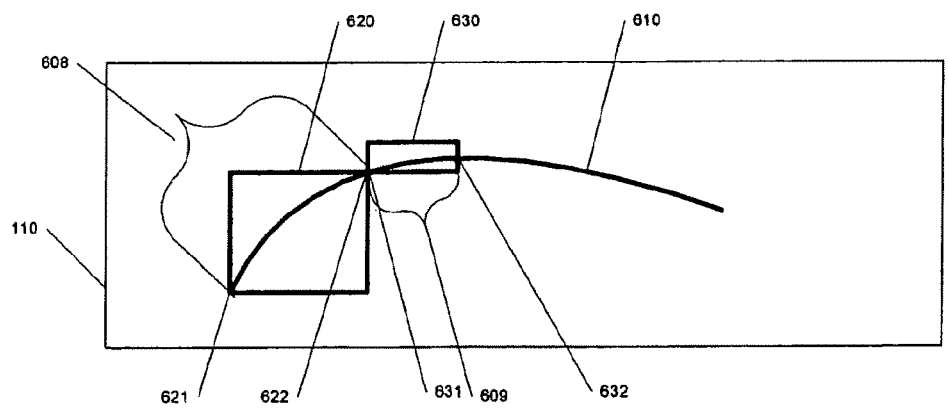

FIG. 6A depicts exemplary aspects of bounding boxes, also called bounding areas, for indexing stroke 610 made on surface 110. Using digital pen 101, a user may make stroke 610 on surface 110. The stroke may then be electronically recorded in the form of a series of time-stamped positions reflecting the movement of the marking element 104 in relation to the surface 110 when the stroke was drawn. However, instead of saving all the time-stamped positions, further processing may be carried out in processing module 136, digital pen 101, remote device 150, or any other appropriate device. Processed data related to stroke 610 may be stored in storage module 130. For example, at least one of bounding areas 620 and 630 may be defined based on stroke 610. Bounding areas 620 and 630 may encompass a temporal portion of stroke 610. Bounding areas 620 or 630 may be limited based on the amount of time taken to convey a particular portion of stroke 610. For example, as discussed earlier, a maximum time for a portion of a stroke encompassed in a single bounding area may be one second. If each of first portion 608 and second portion 609 of stroke 610 took one second to draw, then bounding areas 620 and 630, respectively, may be defined based on the temporal duration allowed for defining a single bounding area 620 and 630. One extreme 621 of bounding area 620 may be defined as the start of stroke 610. After stroke 610 ceases or after one second (or any other appropriate amount of time), the opposite extreme 622 of bounding area 620 may be defined. First portion 608 of stroke 610 may be encompassed by bounding area 620. A second bounding area 630 may begin at extreme 631, where previous bounding area 620 finished. The opposite extreme 632 of bounding area 630 may be defined by the end of stroke 610 or the end of a time period, such as one second from the time that second portion 609 of stoke 610 began. In some embodiments, all of stroke 610 is encompassed by bounding areas.

Bounding areas 620 and 630 may be defined by a portion of stroke 610 and may be of a limited size. First portion 608 of stroke 610 may be covered by bounding area 620. First extreme 621 of bounding area 620 may be defined by the start of first portion 608 of stroke 610. The opposite extreme 622 of bounding area 620 may be defined as a position on stroke 610 that obeys a certain mathematical relationship with first extreme 621 of bounding area 620. For example, second extreme 622 of bounding area 620 may be defined as a position on stroke 610 that is a maximum absolute distance D from first extreme 621 or is a maximum distance along one or both axes from first extreme 621. Second extreme 622 of bounding area 620 may be defined as a position on stroke 610 that would cause bounding area 620 to reach a certain maximum area A. Second extreme 622 of bounding area 620 may be defined by any other appropriate relationship.

Bounding areas 620 and 630 may be defined by one or more criteria, such as, for example, whether portion 608 or 609 of stroke 610 was drawn within a certain time T and obeys certain mathematical relationships F. One extreme 631 of bounding area 630 may be defined as the closing extreme 622 of bounding area 620. Opposite extreme 632 of bounding area 630 may be defined as the closer of a position on stroke 610 that was drawn within time T of first extreme 631 of bounding area 630 and a position on stroke 610 that is within a distance D of first extreme 631 of bounding area 630.

Bounding areas may be axis-aligned (pictured with respect to bounding area 620 and 630), may be aligned along other lines, may be aligned to minimize the area contained in the bounding area, may be aligned to maximize the area contained in the bounding area, or may be aligned or positioned in any other appropriate manner. Bounding areas may be one or more of rectilinear, circular, elliptical, rhomboidal, or any other shape defining an area or region.

Processing module 136, digital pen 101, remote device 150, or any other appropriate device or process may determine bounding areas 620 and 630. Definition of bounding areas 620 and 630 may be performed as stroke data is collected or after stroke data is collected.

In one exemplary embodiment, the bounding boxes are generated as follows in e.g. a processing module 136. When the module receives a first x-y coordinate of a stroke, the generation of a first bounding box is started. The rectangular bounding box is defined by a minimum x-y coordinate of the surface 110 and a maximum x-y coordinate thereof received during a predetermined time period of 1 second. The first and second received x-y coordinates of the stroke define the bounding box to start from by being seen as the diagonal corners of a rectangle. When the next x-y coordinate is received, the module will check if this x-y coordinate is outside the currently defined bounding box. If so, it will grow the box so that the new coordinate will be at the perimeter of the bounding box. If not, the new coordinate will be discarded and no update carried out to the bounding box. The bounding box is allowed to grow during the predetermined time period or until it has reached a predetermined size before the expiry of the time period. The only coordinates saved during that that time are the ones defining the diagonal corners of the bounding box, i.e. the minimum and the maximum x-y coordinates. When a box is completed, the coordinates defining the box are saved together with their time stamps and a unique ID. Then the generation of a next bounding box is started. A next bounding box may also be started before the previous bounding box is completed so that overlapping bounding boxes are obtained.

The time stamps of the bounding boxes may be used to link the bounding boxes and thereby the notes made on surface 110 to other data sets captured by digital pen 101, remote device 150 or any other appropriated device so that the other correlated data, such as audio or video, can be recalled or played back from surface 110.

Placement or tapping of digital pen 101 within bounding box 620 may for instance cause processing module 136 to playback a correlated audio file at the time indicated by the time stamp of the bounding box. If the digital pen 101 is placed outside but close to a bounding box, the processing module 136 may be configured to search for a neighboring bounding box and to start playback of correlated data from a time associated with the time stamp of the neighboring bounding box.

If a user places digital pen 101 in a place where two bounding boxes overlap, the processing module may be configured to start play back based on the earliest or latest time stamp. In one embodiment the user may control if the earlier or later time stamp is to be used by tapping once or twice with the data capture device. In another embodiment, the user taps a first time in the overlap area to trigger play back based on the earlier time stamp, and a second time in the overlap area to trigger play back based on the later time stamp.

In one embodiment, processing module 136 uses the page identity or page address of the coordinate sensed by digital pen 101 when placed on the surface at the time of replay to find a catalogue where all bounding boxes of the relevant page are stored. When the relevant page address catalogue has been identified, the processing module 136 may create a list reflecting that page's area engine state. The list may include the .AES file(s) of that page with all the bounding boxes of the page and the corresponding .dat file(s). The processing module 136 identifies the ID of the bounding box to which the coordinate sensed by digital pen 101 belongs. The ID is then used to find the associated time stamp in the .dat file with the same name. The time stamp is used as an index into the audio file with the same name so that the play back is started from the point in the audio file corresponding to the time stamp.

Figure 6B:
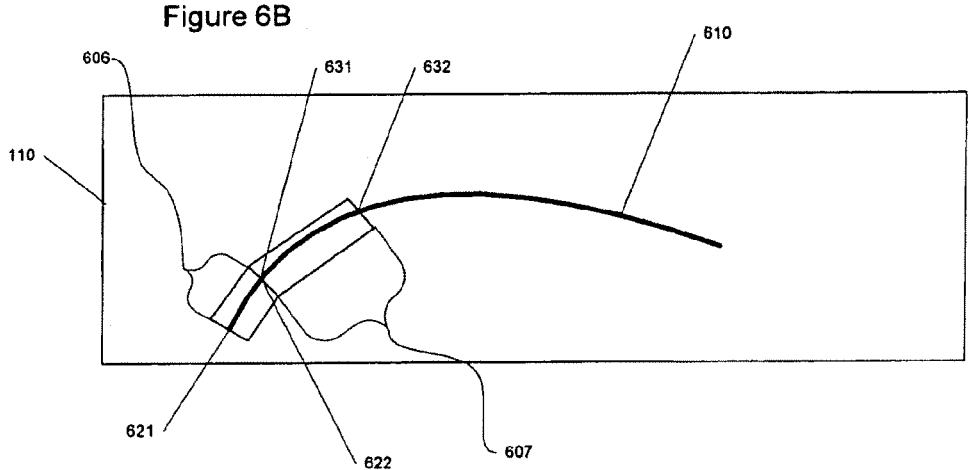

FIG. 6B depicts another exemplary embodiment of the generation of bounding boxes based on stroke 610 made on encoded surface 110. The edges of the bounding boxes may be defined according to a mathematical relationship to stroke 610. For example, one or more edges 621, 622, 631, and 632 of bounding boxes 606 and 607 may be perpendicular to the point on stroke 610 at which the respective edge crosses stroke 610. For example, edges 621 and 622 may be perpendicular to stroke 610. The lengths of edges 621 and 622 may be set so as to not exclude any portion of stroke 610 when edges 621 and 622 are connected to form bounding box 606. The points at which edges 621 and 622 are positioned may be a function of the time taken for stroke 610 to be made between these edges 621 and 622. In some embodiments, edges 621 and 622 may be drawn every one second. The time interval at which edges 621 and 622 may be drawn may be more or less than one second or may be variable. Edges 621 and 622 to bounding box 606 may be drawn when stroke 610 has covered an absolute distance D from leading edge 621. A variable distance may be traversed by digital pen 101 on encoded surface 110 after drawing leading edge 621 of bounding box 606.

Other embodiments may use other kinds of bounding boxes. One embodiment may for instance generate a single bounding box for each pen stroke. United States published patent application no. US2003/0023644, assigned to Anoto and incorporated herein by reference, discloses e.g. the use of a minimal convex envelope surrounding a pen stroke for identifying data to be edited.

Another embodiment may look at groups of strokes and generate a single bounding box for e.g. each word or drawing.

3.2 Predefined Areas for Linking Notes and Recorded Media

As previously described, bounding boxes, which are dynamically defined, will have sizes that vary based on circumstance. As an alternative, processing module 136 might divide surface 110 into predefined areas or regions, such as regions 615 as depicted in FIG. 6C. Regions 615 may all be the same size as illustrated, or may be of varying predetermined size. While FIG. 6C illustrates all regions 615 as square in shape, regions 615 could be any rectangular or other shape, and an encoded surface 110 may be composed of regions 615 of one or more shapes. Regions may for instance correspond to the areas between lines on a lined paper. In one exemplary embodiment a page is divided into 40*100 regions. Regions 615 could, but need not be marked on the surface. The division into regions may be based on a logical grid, and information identifying the pattern may be stored in digital pen 101, separate device 150 or any other appropriate device. The extent of each region may be defined by a set of coordinates, e.g. the coordinates of the diagonal corners in the case of square or rectangular regions, or by another mathematical definition or in any other appropriate way. Each region may be associated with a unique ID defining the region. Data related to stroke 610 may be processed by processing module 136, and may be stored in storage module 130. Stroke area 640 may be defined as each region 615 contacted by stroke 610. Extra stroke area 650 may be defined as all regions not contacted by stroke 610 but adjacent to or touching a region in stroke area 640. In other embodiments other rules may be applied for defining the extent of extra stroke area 650.

When predefined regions are used as a linking mechanism, notes made by digital pen 101 on surface 110 may be indexed in processing module 136 in digital pen 101 or separate device 150 or in any other appropriate device. When the processing module 136 receives a first x-y coordinate of a stroke, processing module 136 may check to determine the region in which the x-y coordinate belongs, and associate a time-stamp with that region. The time stamp may be that of the coordinate or a time stamp allocated according to some other principle. The first x-y coordinate may then be discarded. When the processing module 136 receives the second x-y coordinate, it may similarly check to the region in which the second x-y coordinate falls. If it belongs to the same region as the first x-y coordinate, then no further step need be carried out. If, on the other hand, the second x-y coordinate belongs to another region, this other region may be time-stamped in a manner similar to that described above in connection with the first region. This procedure may be repeated successively for all position data making up the notes on surface 110.

In one embodiment, all regions hit by a pen stroke between pen-down and pen-up may be provided with the same time stamp, e.g., the time stamp of the first coordinate of the pen stroke. For stroke 610 in FIG. 6c that would mean that all regions within stroke area 640 would be provided with the same time-stamp.

The time stamps of the regions may be used to link the regions and thereby the notes made on surface 110 to other data sets captured by digital pen 101, separate device 150 or any other appropriated device so that the other correlated data can be recalled or played back from surface 110.

Predefined regions 615 may by used to playback media such as audio, linked to stroke 640. For example, when correlated media includes an audio file, placing digital pen 101 in a region in stroke area 640 may cause processing module 136 to playback the correlated audio file at the time indicated by the time stamp of the region. If the digital pen 101 is placed in a region in extra stroke area 650, which region does not have a time-stamp, the processing module 136 may search for an adjacent region in stroke area 640 which has a time-stamp and playback the correlated audio file based on the time-stamp of the adjacent region. In another embodiment the processing module 136 may determine already in connection with the indexing which regions belong to the extra stroke area 650 and associate these regions with an appropriate time stamp.

In yet another embodiment, the surface is a surface of a form, which includes human-understandable information and fields to be completed by a user. The whole form or only predefined fields may be Paper Replay™ enabled. A media recording may start automatically when the user starts to write on the form or in any of the predefined fields, or the user may have to manually start the media recording e.g by. tapping a Paper Replay™ icon or symbol on the form. The form can for instance be a form used by a doctor when questioning a patient about his problems. A field could be predefined as one or more fixed bounding boxes, or bounding boxes may be generated around the pen strokes as defined above within a field in which a Paper Replay™ session occurs.

3.3 Exemplary Algorithms for Reconciling Adjacent or Overlapping Strokes

FIG. 6D depicts exemplary aspects of indexing strokes 610 and 611 made on surface 110. Parts of one and the same pen stroke or different pen strokes made with digital pen 101 on encoded surface 110 may touch, such as, for example, first stroke 610 and second stroke 611, may cross each other or may overlap each other or may be very close to each other. In such case a region may be hit more than once by the same pen stroke or different pen strokes and the processing module 136 may be configured to associate more than one time-stamp with a region. That is, when a region is hit for the second time (after at least one other region having been hit in between) by a pen stroke, the processing module 136 may add another time-stamp to the region. Regions within the extra stroke area 650 may also be provided with more than one time-stamp.

A user may for instance access media correlated with either first stroke 610 or second stroke 611 or both in sequence by placing digital pen 101 in region 642, which may have two different associated time-stamps since it has been hit both by stroke 610 and by stroke 611. For example, in some embodiments, a user may use digital pen 101 to tap region 642 once to access the media correlated with first stroke 610 and twice to access the media correlated with second stroke 611. Alternatively, in the event of overlap, the processing module 136 may simply not respond, or may signal the user to reposition digital pen 101 in a more precise manner.

As illustrated in FIG. 6D, extra stroke area 651 associated with second stroke 611 may overlap extra bounding area 650 of first stroke 610, such as, for example at overlapped region 652. A user may access media correlated with region 652 in the corresponding way as described above in connection with region 642. If time-stamps are pre-associated with region 652, the processing module 136 may use the relevant one to access media. Otherwise, the processing module 136 may search for adjacent time-stamped regions and use the time-stamps thereof.

Figure 6E:
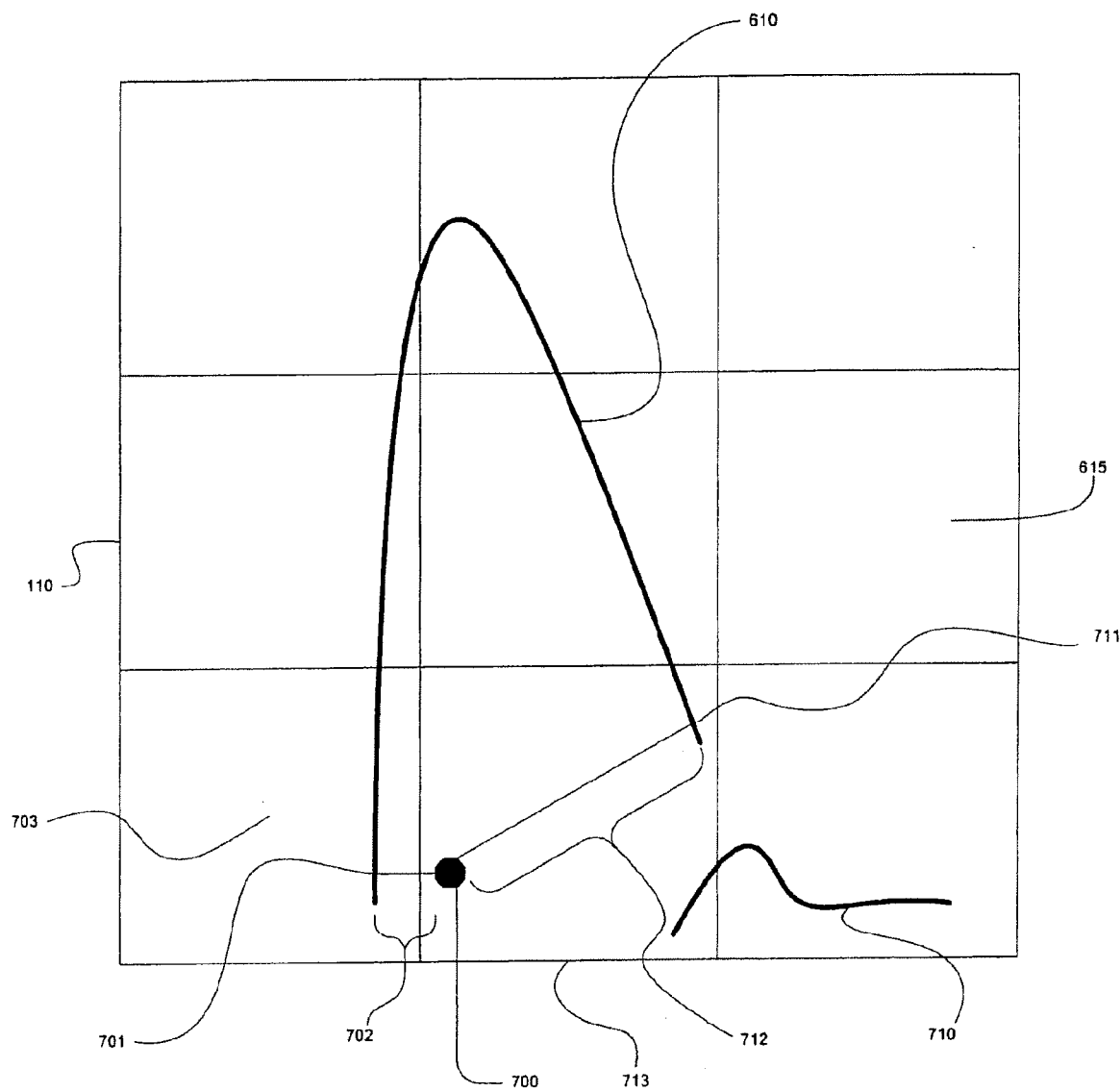

FIG. 6E depicts a method of playing back data from a different region than the region in which the user places the pen for triggering play back. For example, a user may use digital pen 101 to draw strokes 610 and 710 on encoded surface 110. Processing module 136 may time stamp a new region 615 each time it is entered. In some embodiments, stroke 610 may pass through different regions, e.g. region s 703 and 713, which have different time stamps because they were entered at different points in time. In an effort to playback media correlated to stroke 610 at a time correlated to point 701, a user may use sensing device to make mark 700. If play-back is strictly defined by in which region the user makes mark 700, processing module 136 will start play-back of media at a time given by the time-stamp(s) associated with region 713. In some embodiments, processing module 136 may however determine the shortest distance 702 between mark 700 and strokes 610 and 710 on encoded surface 110. Processing module 136 might then playback the correlated media starting with the time-stamp associated with the region in which point 701 is situated, i.e., the time stamp associated with the region to which the pen stroke portion closest to the user mark 700 belongs.

3.4 Linking Differing or Similar Types of Media

The preceding embodiments were described in connection with the linking of notes and media such as audio or video. In a broader sense however, the invention may not only be used to link audio or video recordings to notes, but may also be employed in connection with the linking of multiple differing types of media, or multiple similar types of media. By way of other examples, two executives taking notes in a meeting may be able to link their respective notes, regardless of how each chooses to record notes. That is, one or both may have chosen to take notes using a digital pen, tablet, laptop computer, or other information input device, and yet their notes might still be linked so that when one accesses a notation, the other's notation might also be simultaneously (or sequentially) accessed. Aspects of the invention might permit a physician at a conference to link notes taken on her laptop with an audio recording of the conference later downloaded from a web site authorized by the conference organizer. A movie critic might take notes with a digital pen during a movie, and then be able to quickly access those portions of the motion picture corresponding to particular notes.

The linking can occur, for example by synchronizing markers associated with each recorded media. For example, if the same time code is associated with information recorded in multiple media forms, then when the user accesses information (e.g., a note written with a digital pen) in one medium, the time code associated with that note may be accessed and used to trigger playback from linked media (e.g., an audio recording) sharing the same time code.

3.5 Subsequent Linking of Recorded Media to Notes

In a number of the previously described embodiments, recorded media was linked to simultaneously written notes. The invention may also be used to link notes with non-concurrent recorded media (e.g., audio or video) captured before or after a notetaking session. To this end, an earlier or later time-varying signal may be stored in storage module 130. Such a time-varying signal might be captured by digital pen 101, separate device 150, or may be imported from some other source. Thereafter, a user might manually add indices to the note file and media file in order to cause correlations that allow for portions of one to be recalled when the other is accessed. For example, processing module 136 may create new indices into an audio file when a user makes marks with marking element 104 on encoded surface 110 during a playback of the audio file. Processing module 136 may use the new indices to correlate the new notes taken during playback with the position in the audio file playing at the time the new notes were taken, storing one or more of the newly created indices, the position data, and the time stamp information in storage module 130. Of course, indices could also be inserted into files containing media other than audio, such as video files, rich media files, or computer media files. And indices might link a single note file to multiple types of recorded media files.

The various examples linking stylus strokes to recorded media are exemplary only and are not intended to limit the scope of the claimed invention.

3.6 Synchronizing Multiple Concurrent Media Recordings

Multiple media recordings of the same event may be synchronized. For example, two users may use two digital pens 101, each having a microphone 137 associated with data input module 138 to capture the same audio input, such as, for example, a lecture. Each of processing modules 136 may create index points into the separate audio files captured by the microphones 137 and stored on one or more storage devices 130. Processing module 136 may integrate the indices by identifying reference points within the audio files. For example, processing module 136 may use known techniques in signal processing to identify one or more points in a first audio file with a unique or a non-common frequency profile. Processing module 136 may then search the second audio file for a similar frequency profile. When processing module 136 finds a point in the second audio file with a similar frequency profile, processing module 136 may synchronize the two audio files at this point. Processing module 136 may attempt to synchronize multiple points in each audio file, and may then use the synchronization points to integrate the indices of the two audio files.

The integrated indices may include markings, pointers or indices to the best quality audio from each file, retaining the best quality for playback. Processing module 136 may also cause a new audio file to be generated containing the portions of each file having the best audio quality. More than two audio files may be synchronized in a similar manner.

3.7 Data Layering

Multiple locations from one or more media files may be layered together, correlating to the same position on encoded surface 110, regardless of whether the media files include one or more of audio files, video files, computer presentations, rich media, photographs or other still images. When a user positions digital pen 101 at or near such a position on encoded surface 110, the user may be given a choice of which media location to playback. For example, a textbook may include encoded surface 110 next to an excerpt from Shakespeare. Encoded surface 110 may be correlated to different audio files, such as, for example, an audio files describing the historical background of the passage and the economic conditions existing at the time, a video file of a theatre company performing the excerpt, and a text file elaborating on the literary devices used in the passage. By positioning digital pen 101 over encoded surface 110, the user may be given a choice by processing module 136 of recalling one or more of these three associated files. For example, processing module 136 may audibly prompt the user to select between the three files. A response may be audibly received, for example, via microphone 137 associated with data input module 138, and thereafter processed in processing module 136 using a speech recognition algorithm. User input may alternatively be received using a camera in sensing device 120 to capture responsive markings made by the user with digital pen 101. Processing module 136 may prompt user input via display screen 125, on digital pen 101 or on separate device 150.

The concept of layering media data may be used in a musical setting. For example, code recognizable by digital pen 101 may be associated with various locations in a musical score. The encoding at each of these locations may be correlated with positions in one or more audio files containing sounds made by different instruments playing at that position in the musical score. When a user places digital pen 101 over one of these locations in the musical score, processing module 136 may give the user the option of hearing the sounds of one or more instruments at this point in the score. Processing module 136 may give the user the option of singly listening to each instrument or combining multiple instruments. To indicate the instrument to be heard, the user may place digital pen 101 on or near different subsections of encoded surface 110. For example, encoded surface 110 may include a section containing a list of instruments. The user may place digital pen 101 on or near one of the instruments on encoded surface 110 to choose the instrument to be heard. Then, when the user places data sensing device 101 at a location on the musical score, the output of the chosen instrument at that point in the musical score may be played, for example, on a speaker on data sensing device 101. The audio file may begin playing as soon as digital pen 101 is placed on or near one of the points of the musical score containing one of the subsections of encoded surface 110.

4.0 Buffered Recording

Processing module 136 may be used to buffer data received from recording module 135. For example, a user may wish to record audio of only portions of a lecture deemed important by the user. To this end, processing module 136 may be programmed to capture, compress, and store only a limited amount of data recorded by the recording module 135, such as a predetermined time window (e.g., 2, 3, 5, or 10 minutes). Processing module 136 may be programmed to discard the buffered recordings unless, within the predetermined time window, the user captures data using sensor module 120.

The size of the predetermined time window may be preset in the processor, or may be selectable by the user. For example, a hard or soft button/display may allow the user to adjust the buffer window. Alternatively, the user might be able to control the buffer size by making marks on encoded surface 110. Recognition software associated with digital pen 101 may permit the user-drawn controls to be recognized, or may permit the user to adjust buffer size (or any other functional features) using pre-printed control icons on encoded surface 110. Such pre-printed icons might include, for example, a scroll bar or printed numeric pad that permits the user to enter a preferred buffer size.

Thus, depending on preferred configuration, a user may cause processing module 136 to save a portion of the buffered data by drawing a special symbol or mark recognized by processing module 136 on encoded surface 110 with digital pen 101. Or, the user may cause processing module 136 to save a certain amount of data by drawing a number in addition to the special symbol on encoded surface 110 with digital pen 101. The amount of buffered data to be stored may be a function of the number of symbols, such as "tick" marks, drawn on encoded surface 110 using digital pen 101. Processing module 136 may save a certain amount of buffered data, such as five seconds of buffered data, for each mark it detects as being placed on encoded surface 110 using digital pen 101. Some embodiments may begin saving data when a special symbol is drawn on encoded surface 110 and continue saving data until the same special symbol is drawn a second time on encoded surface 110.

5.0 Exemplary Paper Replay™ Play Back Mode

A user may need to perform an action to signify that playback is desired. For example, a user might start playback of recorded media engaging a hard or soft control on digital pen 101 or separate device 150, or by activating controls using digital pen 101.

5.1 Hand-Drawn Playback Control

For example, a user may use digital pen 101 to draw a special symbol on encoded surface 110 to signify that playback of media should start. After such a special symbol is drawn, processor 136 might search for the closest adjacent index, and play the associate media file. Alternatively, after such a special symbol is drawn, replay might begin only the next time a user places digital pen 101 on or near previously indexed markings on encoded surface 110. When a user draws such a special symbol on encoded surface 110, playback may occur until the user either retaps the symbol, or draws a similar symbol on encoded surface 110. In some embodiments, the user may place digital pen 101 on or near an already existing symbol on encoded surface 110 to signify that playback is desired.

In some embodiments, a user may use the same mark both to signify that playback is desired and to signify the point at which playback is desired. For example, a user may signify that playback is desired by placing and keeping sensing device on or substantially close to the same point of encoded surface for at least a pre-determined amount of time, such as, for example one-half of a second. In some embodiments, for example, a user may signify that playback is desired by placing digital pen 101 on encoded surface 110 and removing it before a pre-determined amount of time has ellapsed, such as, for example, one-tenth of a second. Processing module 136 may use the point at which digital pen 101 contacts encoded surface 110 as the point at which playback is desired.

5.2 Playback Control Using Pidgets

Plackback might alternatively be invoked by tapping digital pen 101 on a playback pidget on surface 110. A pidget may simply be a pre-printed visible symbol associated with code recognizable by processor module 136 as having functionality. If a pidget is tapped, the processing module 136 might then recognize a tapped pidget x-y coordinate as corresponding to a playback command. Thereafter, when the user taps at or near a pen stroke on surface 110, the corresponding x-y coordinate might then be sent to processing module 136, which identifies all bounding boxes associated with the x-y coordinate. If there are more than one associated bounding boxes (case of overlapping bounding boxes), processing module 136 might select the one with the lowest (earliest) ID/timestamp. In one embodiment, the application might select the one with the second lowest ID/timestamp if the user taps a second time in the same bounding box without tapping anywhere else in between.

Logic in processing module 136 might aid in selection when bounding boxes overlap. For example, the processing module 136 might take into account the last audio playback recalled by the user, selecting for the next playback audio that most closely succeeds the prior audio recalled.

Processing module 136 might load the files of the page address catalogue in which a selected bounding box is stored. The audio playback may then be started from a point of time in the audio file corresponding to the time stamp of the selected bounding box. Preferably the playback is started a predetermined or selectable time prior to the time indicated by the timestamp ("latency") so that the user hears what was said slightly before a note was made. As an alternative, the application can analyze the content of the audio file and identify a pause in the speech, so that the playback can be started, for example, when a new sentence is started.

When used in connection with an embodiment such as that of FIG. 2B, digital pen 101 may send playback commands to separate device 150, which may play back the recorded media based on the position data. For example, digital pen 101 may sense a position on paper 110 and send it via communication modules 140 and 141 to separate device 150, thereby initiating playback of the correlated audio data stored in storage module 130, regardless of whether storage module 130 is located in digital pen 101 or separate device 150.

5.3 Offset Playback

Processing module 136 may use an offset to determine a point in the correlated data at which to begin playback. For example, when the correlated data is an audio recording of a lecture, surface 110 is a piece of paper, and digital pen 101 is a pen, placing the pen back in the position where notes were taken on surface 110 may cause processing module 136 to play back audio recorded at precisely the time the notes were written, or beginning at some predetermined time before the notes were written. The predetermined time, or "offset," may be fixed or user selectable, through control features such as those described previously. Alternatively, the system may be configured to automatically play back the audio that spurred the taking of notes on the page. For example, a logic algorithm may correlate the placement of the pen on the page to a new phrase or starting point in the associated audio recording.

Playback of correlated data may occur for a set period of time, for a user-selected period of time, or for a combination of set and user defined periods. For example, after a preset period of time, playback might automatically stop unless the user activates a control to continue. So, for example, processing module 136 may insert indices into the audio file when digital pen 101 makes marks on encoded surface 110, correlating each index to one or more of these marks. Placing digital pen 101 in the position where a note was previously taken on surface 110 may cause processing module 136 to playback two minutes of audio correlated with the note. The two minute playback may begin at a point just before the index correlated to the notes. Of course, depending on design or control choice, playback may occur for more or less than two minutes, might continue uninterrupted until the user activates a stop control, or might continue until the end of audio file has been reached.

5.4 Playback Control Based on Content

The duration of playback might be keyed to content. For example, playback time may be a function of the occurrence of key words or phrases recognized by a processor algorithm. The amount of playback that occurs might also be a function of the vocal characteristics of speaker who is talking, as controlled by a processor algorithm implemented in processing module 136. Some embodiments may continue playing from this point in the audio file until the current speaker in the audio file stops speaking. Processing module 136 may identify the speaker using vocal characteristics analysis and may find all other instances in a session in which the speaker talks. For example, processing module 136 may identify the speaker at the position in the audio file correlated to a particular note. Processing module 136 may then find all other notes correlated to positions in the audio file in which the same speaker is speaking. A user may use digital pen 101 to write on encoded surface 110 an identifier for the speaker, such as for example the name of the speaker. After this speaker identifier is captured and stored, it might then be linked to each future instance of speaking by the same speaker. This same process might be repeated for multiple speakers in the same session, thereby permitting a navigated playback based on the speaker. If the invention is used in connection with a display 125, a current speaker's identity might be visually displayed.

5.5 Tagging of Data and Playback Based on Data Tags

Figure 9A:
FIGS. 9A-9D depict exemplary data tags which may be used in connection with the invention.
Figure 9C:
Figure 9B:
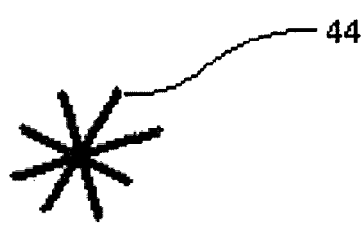
Figure 9D:
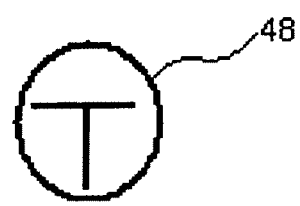

The invention may permit a user to tag data and thereafter recall for playback all data associated with the tag. A tag may be any user drawn symbol that is either predefined or defined by the user. By way of example only, a tag may be a circle dot 42 such as is illustrated in FIG. 9A; a hand-drawn asterisk 44 such as is illustrated in FIG. 9B; a spiral 46 as is illustrated in FIG. 9C; or a circled letter 48 as is illustrated in FIG. 9D. Characteristics of a tag may be stored within storage module 130. Processing module 136 may compare location signals received via sensor module 120 with a data tag symbol definition stored in storage module 130. Thus, using known image processing techniques, processor 136 may be capable of determining when the stylus is used to draw a data tag.

The processing module 136 may be further configured to tag data regions associated with each identified data tag symbol. As illustrated for example, in FIG. 10, a user has drawn three data tags 42 adjacent three notes on a page. It should be emphasized that although the notes in FIG. 10 are shown as being printed, they could as well be handwritten notes previously recorded by digital pen 101. The processing module 136 may employ one or more of image processing, time based logic, or other known techniques to define a data region such as data regions 43, 45 and 49. Using image processing techniques and/or analyzing the x-y coordinates representing the notes, the processor might note that text 41 is surrounded above and below by empty space. Therefore, image processing logic might define tag data region 43 based on the fact that text 41 is set off from other text and has tag 42 drawn adjacent to text 41. While text 47 is not set off from adjacent text, the processing module 136 running image processing logic and/or analyzing the x-y coordinates representing the notes, might note from time tags that text 47 was set off in time from the text above and below. Thus, the processor might use the time differential to define tag data region 45.

By way of another example, image processing techniques and/or coordinate analysis might be used to note that text 50 has been circled and tagged and therefore logic in processing module 136 defines tag data region 49 as including the circled text.

The above described techniques either alone in combination with each other, or in combination with other techniques may be used in a known manner in order to identify tagged data regions.

After data regions are tagged, a user might be able to organize or recall data by either redrawing a tag or by tapping in a predefined manner, one of the already drawn tags. Depending on system settings, such actions might cause each piece of tagged data to be combined and displayed together; to be played and/or displayed sequentially, or to be presented to the user in any organized fashion defined by either the user or the system manufacturer.

The system may enable multiple tags to be used. Thus, in one document a user might be able to tag multiple pieces of data with multiple tags.

6.0 Variable Control Icons

Since a digital pen contains limited surface area for inclusion of control buttons that permit variable control, it may be beneficial to provide digital pen 101 with the capability of variable control and/or variable navigation using handwritten notations detected by the sensor module 120. Such variable control can be used to control media playback, but also can be used for a host of other control and navigation functions, which may, but need not, be related to the Paper Replay™ concept.

Figure 4A:
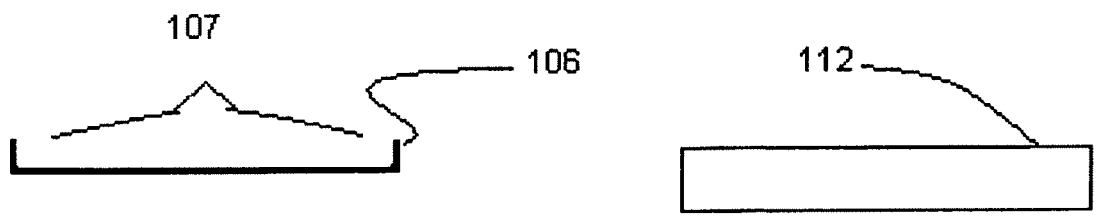
FIGS. 4A-4G depict various exemplary embodiments of variable control icons which may be used in connection with the invention.
Figure 4C:
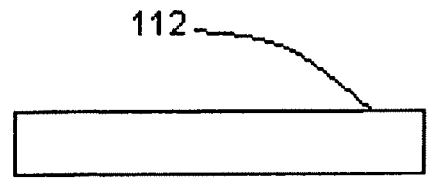
Figure 4B:
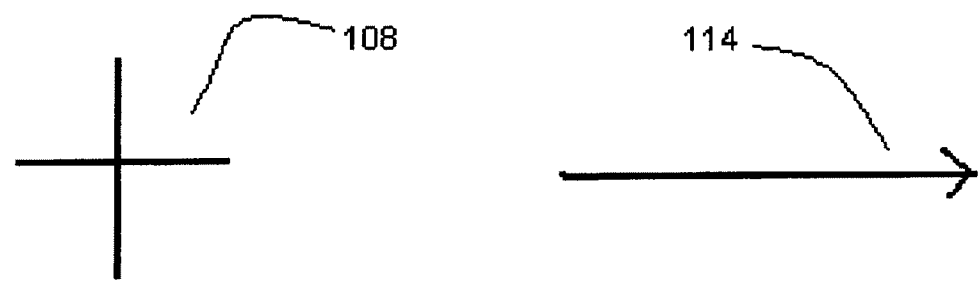
Figure 4D:
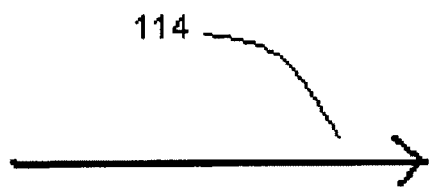
Figure 4E:
Figure 4F:
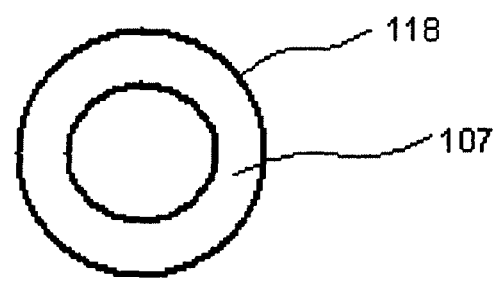
Figure 4G:
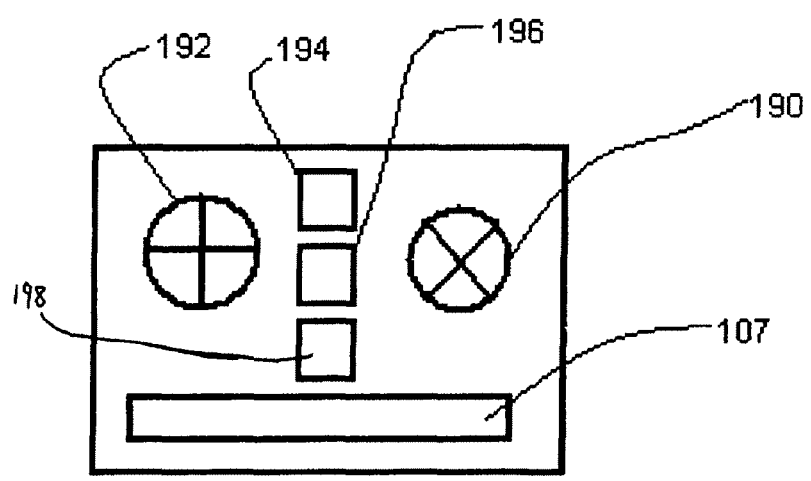

Thus, in accordance with the invention there may be provided a memory location for storing contour information identifying parameters of a variable control icon, the variable control icon defining at least one variable control region for enabling variable control adjustments. As embodied herein, a variable control icon may be any symbol or marking either pre-printed or hand-drawn by a user. By way of example only, the variable control icon may be as simple as an elongated line 106 having tails at each end such as is illustrated in FIG. 4A; a plus sign 108 such as illustrated in FIG. 4B; an elongated rectangular box 112 such as illustrated in FIG. 4C; a directional arrow 114 such as is illustrated in FIG. 4D; a line 116 with circles at either end such as illustrated in FIG. 4E; two concentric circles 118 such as is illustrated in FIG. 4F; or even a more complex combination of symbols 119 such as is illustrated in FIG. 4G. Of course, any shape, area, or volumetric representation, either alone or in combination may be used to represent a variable control icon.

Contours (e.g., shape, known location, or other unique characteristics) of a variable control icon may be stored in a memory location that is part of storage module 130.

Using known handwriting recognition techniques, processor module 136 may be programmed to recognize an occurrence of a hand-drawn variable control icon. For example, when processor module 136 receives location signals from sensor module 120, processor module 136 may compare the location signals with stored contour information identifying parameters of a variable control icon. Thus, if a variable control icon is predefined as plus sign 108, the storage module might identify intersecting generally vertical and horizontal lines as being reflective of a variable control icon. When the processor receives a series of location signals, e.g. x-y coordinates, from the sensing module 120 corresponding to variable control icon 108, the processing module may then cause the location of the detected variable control icon 108 to be stored in storage module 130.

In an alternative embodiment, the variable control icon may be pre-printed on surface 110. If pre-printed, the location of the variable control icon is already known, and that location might be stored in memory 130. When location signals received in processing module 136 are compared with a known location of a variable control icon stored in memory 130, the processing module 136 might then recognize the user's intent to invoke a control icon.

The variable control icon may define at least one variable control region. For example, as illustrated in FIG. 4A, the region 107 between the tail ends of line 106 may be designated at a variable control region. Thus, if the variable control icon of FIG. 4A is used to control volume, when the user positions the digital pen 101 adjacent the right side of line 106 in variable control region 107, higher volumes may be achieved, and as the user moves digital pen 101 towards the left side of line 106, lower volumes may be achieved.

In FIG. 4F, the variable control region 107 might be defined by a circular ring between the two concentric circles defining variable control icon 118 or alternatively by a predetermined circular region outside or inside a single circle. Thus, movement corresponding to a traversal of an arc in variable control region 107 might cause a volume of a playback device may be increased (or decreased); playback speed to be increased (or decreased), temporal playback position to be incremented positively (or negatively), or any other appropriate variable control to occur. For example, a clock-wise arc traversal in control area 107 of icon 118 may correspond to an increase in playback speed, while a counter-clockwise traversal of the same arc might cause a decrease in playback speed.

Variable control regions may also be used for scrolling through lists, documents or files. A circular control region may be particularly useful for scrolling through very long lists or documents or the like, where a single line does not provide enough room for fine control of scrolling.

Figure 7:
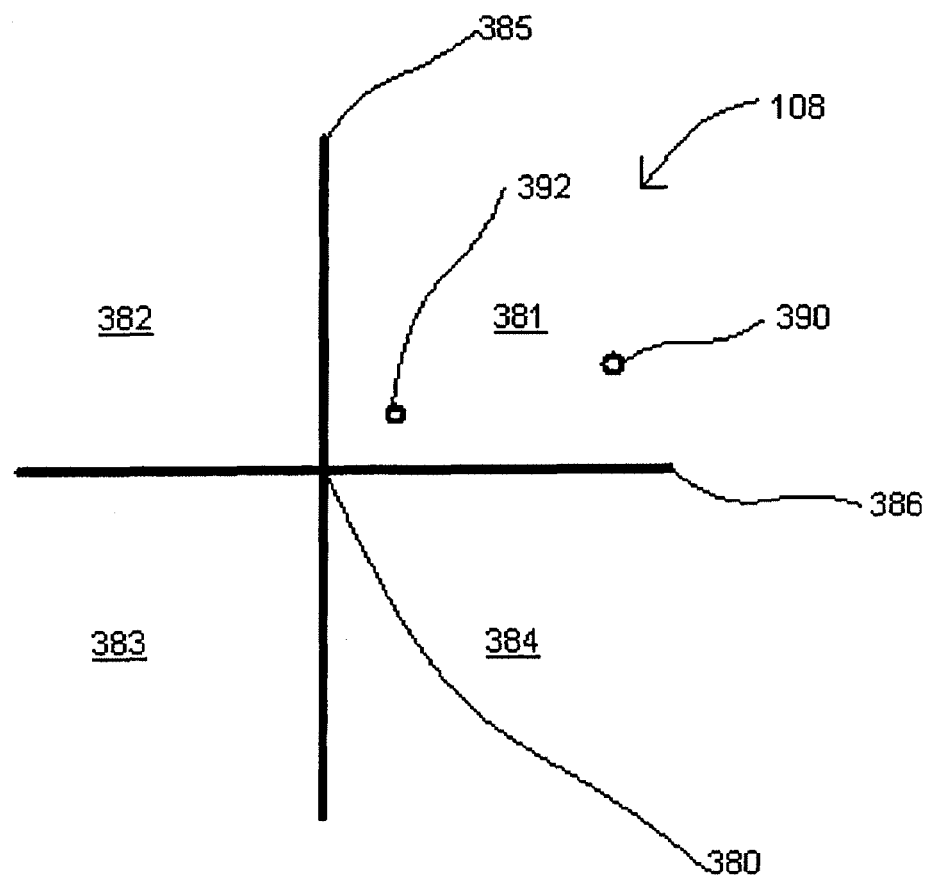
FIG. 7 further illustrates the variable control icon of FIG. 4B.

A single variable control icon may include multiple variable control regions. For example, the intersecting lines of variable control icon 108 in FIG. 4B lend themselves to four differing variable control regions. By way of example, and for purposes of further illustration, the variable control icon of FIG. 4B is reproduced in greater detail in FIG. 7. As illustrated, the intersecting lines 385 and 386 of variable control icon 108 define four distinct control regions 381, 382, 383, and 384. Region 381 may be associated with increases such as volume up, fast forward, etc. while region 382 might be associated with decreases such as volume down and rewind. By simply tapping the digital pen 101 in the associated region, a user may be able to make variable control adjustments.

Each of the regions 381, 382, 383, and 384 of variable control icon 108 may serve a differing function. For example, region 383 might be associated with toggling between successive data files, region 382 may be reserved for volume changes, and region 384 might be used to affect cursor movement on a display screen. Of course these are examples only, and the functionality of variable control regions might vary depending upon application. In addition, the functionality may be preset, and/or the system may permit a user to customize controls to the user's preference.

In accordance with the invention, the processor may be adapted to output a control signal when the distal end of the stylus is detected to be in proximity to the variable control region, the value of the control signal varying as a function of a position of the sensor within the variable control region. For example, in the example of FIG. 7, the greater the distance from ordinate 380 that the user taps in a variable control region might affect the magnitude of the corresponding output signal. Thus, since location 390 is further from ordinate 380 than is location 392, by tapping location 390, a user might obtain a faster playback than would occur by tapping location 392.

Variable control icon 108 may be provided with functionality similar to a joystick. For example, variable control icon 108 may be used to control a cursor displayed on an output screen of digital pen 101 or remote device 150. The position of the cursor on a screen may be caused to move as a function of placement of the marking element relative to the variable control icon 108, and the rate at which the cursor moves may be a function of the position of digital pen 101 relative to marking 380. For example, the further digital pen 101 is positioned away from ordinate 380, the faster the rate at which the cursor may move.

Variable control icon 108 might alternatively be configured to possess the functionality of a tablet. If so, positioning digital pen 101 in control area 384, for example, might cause the curser to move to the lower right hand quadrant of an associated screen. As with a joystick or tablet, control and movement of items other than a curser might be controlled with a variable control icon.

The variable control icon may include regions for affecting non-variable control. For example, the variable control icon 119 in FIG. 4G may permit variable adjustments in regions 190 and 192 and 107 while permitting non-variable adjustments to be affected in regions 194, 196, and 198. By way of example, a non-variable adjustment might be one that simply has a single function such as activating a feature. In contrast, a variable adjustment permits the user to affect control magnitude. Thus, a variable control icon may be used to modulate playback of a recording, control volume, toggle at a variable speed through a file selection, effect various setting adjustments, or enable any other variable control or combination of variable and non-variable control. In addition, the variable control icon may be used to control one or more devices. For example, it may control digital pen 101, and/or separate device 150, as is discussed later in greater detail.

In another embodiment, variable control 108 may be used for navigation, e.g. in an image that is too large to be displayed to scale in a display. The four quadrants of control 108 may be used for generally indicating which part of the image should be displayed in the display at the moment. A tap by the digital pen in a current may signify to the processing module controlling the display function that zooming-in by a present amount should be carried out. Double tap may indicate that zooming-out should be carried out. A tap in the middle of the plus sign may signify that the total image should be scaled down to the extent that it could be displayed in its entirety in the display.

FIG. 8 is an exemplary depiction of a surface 110, pre-printed with a control region 301. Although illustrated at the bottom of a page, control region 301 may be located anywhere on the page including in the margins. As illustrated, control region 301 may be used to control playback of stored data and may include one or more of control regions 310, 315, 320, 325, 326, 327, 330, 331, 340, 350, 360, and 370, which may each correspond to one or more control modes such as playback, record, stop, pause, skip back, skip ahead, seek, volume up, volume down, delete, etc. Elongated control region 350 may correspond to a scroll bar.

Control region 350 may possess the property of modality in that it can be used to control more than one function. Thus, after a user selects a particular control mode by touching digital pen 101 within a control mode region, elongated control region 350 might permit variable adjustment depending on the location in control region 350 where digital pen 101 is placed. In this regard, control region 350 may permit activation or cessation of recording or playback; maintaining an open state of a recording session for further recording; incrementing or decrementing of playback window (e.g., data being played back may be incremented by a certain amount, such as five seconds, or five minutes, and playback may begin again from a point five seconds or five minutes later than had just been played back); adjusting gain of microphone 137; variably selecting data for deletion; selecting a start or end position in a data file; selecting a file storage location; or navigating through a data file. To this end, control region 350 may be configured in a linear, logarithmic, or any other logical relationship that helps a user to navigate. Thus, placing digital pen 101 at a point in control region 350 halfway between the two extremes of control region 350 may cause audio midway through a selected audio session to be played back.

Control region 301 is illustrated as an example only. A control region may be customized for specific functionality and with varying combinations of functionality. For example, when control area 301 is used to control an audio signal, control regions may be used to implement and control audio filters such as a band pass filter, a a low-pass filter or high-pass filter. When control area 301 is used to control a video signal, one or more control regions may be used to control the resolution of a video output. Control regions may be used to control the light contrast of a video display or to manipulate audio and video signals in other well-known ways.

7.0 Data Organization and Storage

In accordance with the invention, information written with digital pen 101 may be organized in many different ways. A few non-limiting examples are provided below.

7.1 Page-Based Organization

The invention may involve a page-based system of organization. For example, each sheet of paper or other discrete surface area may have associated with it a page number or other identifier. When the digital pen 101 is used to generate location signals, the location signals may be stored in memory together with an indication of the surface with which they are associated. In this way, location signals sharing the same surface identifying information may be effectively co-indexed enabling information to be electronically organized based on the physical source of the data. If digital pen 101 is used with an encoded surface 110, pattern 111 may encode a page identifier. In another embodiment, a page identifier may be derived or calculated from pattern 111 using information stored in digital pen 101.

7.2 Grouping Data by Temporal Proximity

Alternatively (or additionally) information may be organized based on a session in which the information was captured. For example, the invention may include at least one processor within processing module 136 for time-stamping marking signals, the processor being configured to permit a user to sequentially recall information associated with marking signals having proximate time stamps. Thus, when processing module 136 time stamps location signals, all location signals occurring within the same session can be organized and recalled together. A session may be defined based on date, periods of the day, or forced markers inserted prior a user. Alternatively, signal processing may be used to identify gaps in time between collected information and when gaps are greater than a pre-specified duration, the processor might interpret the gap as a divider between sessions. As yet an alternative, a session may be defined as beginning when the user activates a data recording by means of input module 138 and as ending when the user deactivates or stops the data recording.

When grouping data according to a data session, processing module 136 may group together all data related to a single audio, video, or media session. For example, using microphone 137 associated with data input module 138, a student may begin recording the audio of a lecture to be stored in storage module 130. During the course of the lecture, the student may take notes on multiple encoded surfaces 110 (e.g., multiple sheets in a notebook). Processing module 136 may correlate the notes taken on each of encoded surfaces 110 with indices pointing to specific locations of the saved audio file. Placing sensing device 101 over any of the notes taken during the lecture might then result in processing module 136 playing back the same lecture. Processing module 136 may begin playing back the lecture at or near the point in the audio file correlated to the note. Although written on multiple encoded surfaces, processor module 136 might be configured to recognize that the notes were recorded in proximity to each other and therefore associate the notes and the related audio with a single audio session.

7.3 Grouping Data by Physical Proximity

Information may be accessed according to the location of the marks or notes made by digital pen 101. When processing module 136 groups according to location, all data written on the same page may be grouped together. When the correlated data includes one or more audio files, placing digital pen 101 at or near a note on encoded page 110 may result in processing module 136 playing only the audio associated with each note on encoded page 110. For example, a student may have taken notes on encoded page 110 over the course of three different lectures where processing module 136 saved each lecture in a different audio file. When the student positions digital pen 101 over a note on encoded page 110, processing module 136 may play back a specific amount of audio from each of the three different audio files that correlates to each note on encoded page 110. Some embodiments using this system may play two minutes of audio for each note on encoded page 110, the audio starting at or near the index created by processing module 136 for each note. In some embodiments, other types of media files, such as video files, rich media files, and computer program files, may be used.

7.4 Grouping Data by Common Markers

In addition to accessing data by location, data may be organized and accessed based on common or related coding patterns detected by a digital pen. That is, repetition of the same or related coding patterns on multiple surfaces 110 can be used as an organizational tool so that processing module 136 may group together information from related surfaces. For example, to facilitate the building of grocery lists, stickers containing a grocery list pattern may be affixed throughout a kitchen in locations where a user is likely to remember grocery items, such as, for example, on the refrigerator or adjacent to a kitchen cabinet. Each encoded surface 110 may be encoded with the same encoding pattern. When digital pen 101 is placed on or near one of encoded surfaces 110 having this pattern, processing module 136 may recognize the pattern and may permit the user to append one or more items to a current grocery list. For example, after digital pen 101 is placed on or near encoded grocery pattern sticker, a new item may be verbally appended to a grocery list by speaking into a microphone associated with digital pen 101. Or the new item may be entered visually using camera 120, or entered using a scanner that either detects a bar code or coded pattern on the product label. Alternative patterns or controls might be used to replay the grocery list. Such an alternative pattern might be located, for example, on each cart at a grocery store allowing a user to position digital pen 101 near encoded surface 110 on a grocery cart to have the grocery list output. The grocery list may then be output audibly using a speaker and/or visually on display screen 125 of digital pen 101.

Data may also be accessed according to special markings. When the correlated data includes, for example, audio in an audio file, digital pen 101 may be used to make a special "index mark" on encoded paper 110 while a microphone in recording module 135 captures audio for the audio file. For example, the index mark may be a circle with a dot in it. When the index mark is made on encoded surface 110, processing module 136 may recognize the mark and may make an index into the audio file. Processing module 136 may use the index to correlate the time of making the index mark with the contemporaneous audio recording. A user may continue to use digital pen 101 to make one or more instances of the same index mark on encoded surface 110 at different times so that additional indices are made into one or more audio files. After a recording session, a user may make additional indices into one or more audio files by placing digital pen 101 on or near a previously made index mark. In this way, multiple indices in one or more data sessions may be associated with the same index mark. Depending on the embodiment, a single action by a user might cause sequential playback of all data with a similarly index mark. For example, double tapping any one of the index marks using digital pen 101 may result in processing module 136 playing back all the data associated with the index mark.

7.5 Topical Grouping of Data

Data might also be accessed according to topics or keywords. For example, a user may have an option for identifying a keyword by speaking it, marking it in an audio file, or writing it down. Using known techniques in signal processing, the frequency characteristics of the keyword or topic may be determined by processing module 136. Processing module 136 may then play back all media data correlated to the topic or keyword. The media data may occur in one or more files.

8.0 Visual and Audible Feedback through Display Screen and Speaker

Digital pen 101 and/or separate device 150 may include a display screen 125, such as a liquid crystal display (LCD), a video display, an light-emitting diode (LED) display, an organic LED (OLED) display, a computer screen, or any other display capable of displaying data. The display screen 125 may also be used to provide corrective feedback to the user, to facilitate control of the pen, to replay stored data or representations of stored data and/or to display data or information about data more or less simultaneously with the recording of data by sensor module 120 and/or data input module 138.

In accordance with the invention, the display screen may provide unique functionality in combination with handwriting recognition software running on a processor in digital pen 101, separate device 150 or in any other appropriate device. Specifically, the invention might include a processor for receiving information from the sensor, the display being connected to the processor and being adapted to display output from handwriting recognition software running on the processor. As embodied herein, handwriting recognition software may be run in processing module 136. Processing module 136, upon detection of particular positions on encoded surface 110, may display information related to the markings present at that particular position. For example, captured handwritten notations may be processed using associated handwriting recognition software in the pen or in separate device 150, and displayed as text on display screen 125.

Either or both of digital pen 101 and separate device 150 may have a display screen 125, used to display information. In addition to handwriting recognition and/or character recognition, display 125 may be used for value added service. For example, when digital pen 101 has been used to write a word, and after processing module 136 has used handwriting recognition software to interpret the word, display screen 125 may display added information such as a spelling correction of the word, synonyms, antonyms, definitions, or a translation of the word into another language. Of course, depending on application any other appropriate information related to the written word might be displayed. Alternatively, a speaker 126 associated with either digital pen 101 or separate device 150 may play a pronunciation, a translation, or any other related information on speaker 126 associated with either digital pen 101 or separate device 150. Similarly, entire sentences written in one language might be visually or audibly translated into another using display screen 125 and/or speaker 126.

In one exemplary embodiment directed primarily to younger people, a user may write a letter, e.g. C, by digital pen. Character recognition software receives the position data and establishes that a C has been written. A speech synthesizing software may then be used to output an audible C to give feed-back to the user that a recognizable letter has been drawn. When the user writes further letters the same procedure is repeated. Processing module 136 may also compare groups of letters with the content of a dictionary. If the user writes a word comprised in the dictionary, the word may be output through speaker 126 using the speech synthesizing software. Further audio information related to the word may also be played back via speaker 126. If for instance the word "DOG" is recognized, a barking sound may be played back. The user may in addition and/or as a supplement tap on already written words to hear it spelled letter by letter, spoken and/or to hear the extra audio played back again. When receiving the position data corresponding to the location in which the digital pen was tapped, the processing module searches for previously stored words written in the proximity. The words may e.g. be stored as a series of coordinates or by means of bounding boxes or predefined regions.

In another exemplary embodiment, the user may write a full sentence, e.g. "Drive me to the station please". A handwriting recognition software in processing module 136 may interpret the words, and the thus-interpreted words may be output word by word or as a whole sentence using a speech synthesizing software or played back as written. The user may then tap a control area to select a different language. By placing digital pen in proximity to the written words, output of the whole sentence or specific words translated into the selected language may be triggered. The user may later on play-back a sentence in a selected language just by tapping the area where the sentence was written again. The user may for instance tap the area immediately after the end of the sentence.

The display 125 may aid in self correction. For example, if a spellchecker in the processing module 136 does not recognize a written word, the user might be able to immediately determine which character or characters were written incorrectly or imprecisely. In this manner, the user might correct bad writing habits so that future instances of the same error are less likely to be repeated. Immediate feedback might also permit the user to correct an error in close to real time. Such correction might occur by re-writing a non-recognized word or by selecting from a pick list of alternative words presented on display 125. In this manner, processor 136 might learn idiosyncrasies of a user's handwriting.

The combination of handwriting recognition and display might also permit the user to use the digital pen 101 to draw control icons and thereafter confirm a command or instruction after viewing display 125.

Information related to the current position of a media file being played back may be displayed on display screen 125. For example, on display screen 125, a status bar might appear, the length of which corresponds to the length of the current media file being played. A pointer might move along the status bar to indicate a current playback position relative to the entire media file. If audio at the three-minute mark of a twelve minute recorded audio session is currently playing, then the pointer on display screen 125 may be positioned one-quarter of the distance from the beginning edge of the status bar. Processing module 136 may cause the progress of the media session to be displayed on some other device, such as the display of a mobile phone or a PDA, on the output of a computer, or on any other separate device 150.

When playing back media, display screen 125 may display the physical location of data correlated to the current playback position. For example, a student's notebook might include numbered pages, and the digital pen 101 might recognize the page number on which a student is writing. Thus, if the student takes notes while simultaneously recording audio of a lecture, the physical page location might be correlated to the audio recording so that during subsequent playback of the audio, the student is provided with an indication of the page of notes corresponding to the audio being played back. In addition to or as an alternative to page number, the display might indicate a notebook name, paragraph number, or any other physical identifying feature or combination of identifying features. Processing module 136 may display such physical location information either directly on digital pen 101, or on some other display, such as the display of separate device 150.

While the display 125 on digital pen 101 or separate device 150 may be used to provide direct feedback related to information written by the user, display 125 might also be used to gather information of interest to a user. For example, by positioning digital pen adjacent to pre-printed code on a placard, map, brochure, or other publication, additional information of interest to the user might be caused to be displayed or played back audibly. In another embodiment, the same information as is already present in a publication may be reproduced in another form. For example, speech synthesis might be used to audibly present previously written or printed information in response to recording by the digital pen of position data associated with the written or printed information.

More particularly, a publisher may for instance provide printed material with position-coding pattern 110 or may enable user to print digital documents to with position-coding pattern 110. Publisher may also link other data, like audio or video, to positions coded by the position-coding pattern. The linked data may be stored on a network server or in a memory module associated with digital pen 101, may be downloaded to digital pen 101 or separate device 150, or may be stored in any other appropriate storage location where it could be accessed from digital pen 101 or separate device 150. When user records the position-coding pattern on the printed document, processing module 136 may recognize position data and provide for output of the linked data via a display 125 or a speaker 126. If the linked data is not present in digital pen 101 or separate device 150, processing module 136 may be configured to make contact with a predetermined device to download or otherwise get access to the linked data.

In one exemplary embodiment the printed or printable document is a map of Paris to which a position-coding pattern is allocated. When the user places digital pen 101 on the Eiffel tower on the map, processing module 136 plays back a linked audio file presenting facts about the Eiffel tower. In another embodiment visual and/or audio feedback can be obtained regarding restaurants or monuments within walking distance from the address corresponding to the location at the map where digital pen 101 is placed.

In another exemplary embodiment, a publisher provides code in a book about birds. When user places digital pen on e.g. a picture of a specific bird, an audio file containing the sound of the bird, may be played back.

Also, if a text book or other document is provided with a position-coding pattern and all the words are linked to the corresponding positions coded by the position-coding pattern, the digital pen can operate as a scanning pen. The user may for instance underline or otherwise mark the words that he or she wants to scan. Based on the positions recorded by the digital pen when carrying out the marking, the processing module may identify and store the marked words.

In yet another exemplary embodiment, a user buying music to be downloaded to a mobile phone or MP3-player may also get a digital document listing the different titles of an album he has bought. The document may be provided with coding pattern, such that when the user has printed the document he may use a digital pen 101 to trigger play back of the different titles by placing his digital pen in the area of the title he wants to play back. In another embodiment encoded lists of music titles may be distributed for marketing purpose. In such case a user may be able to listen to the introduction to each title for free, but may be required to pay a fee to be able to listen to the complete piece of music.

Placing digital pen 101 adjacent to pre-printed code might in another embodiment cause related information previously recorded by the user to be displayed. For example, a user might first touch a coded area on an airline ticket to record a name or a restaurant recommended by a fellow passenger. Recording may for instance be done by speaking the name to microphone 137 in digital pen 101 or separate device 150. The next time the user touches the coded area on the airline ticket, the name of the restaurant may be played back to the user via speaker 126 or displayed on display 125. Or a user might touch the digital pen to pre-printed code on a luggage tag, and thereby recall previously input travel information such as flight times and confirmation numbers. Such information might also be recalled on display screen 125 or may be audibly recalled over speaker 126.

In yet another exemplary embodiment, a calendar and reminder function may be implemented. Digital pen 101 is used to write a note on a surface. Recorded positions of the digital pen are sent to a host device, such as a mobile phone, either in a streaming mode or in a store-and-send mode. The note may be scaled to the size of the display of the host device or presented in 1:1 scale or any other scale selected by the user, e.g. by means of scaling pidgets. The note may be associated by a date and time input by the user via a user interface of the application running on the host device or via digital pen 101. The application may trigger an alarm at the indicated date and time. The alarm may include display of the note on the host device's display. The note may be converted to printed text by means of handwriting recognition algorithms. It may be stored as an entry in an electronic calendar. The user interface of the application may allow the user to manage his notes in different ways, e.g. view a list of stored notes, delete stored notes and edit notes.

9.0 Word Processing Functionality

While display 125 might provide feedback about errors, a user might be able to correct errors using digital pen 101 as a word processing editor. Processing module 136 may receive location signals via sensor module 120 and convert the handwritten notations into text using handwriting recognition software as previously discussed. Thereafter the text may be transmitted via communications module 141 to a separate device for transmission as an e-mail and/or for importation into a word processing program such as Microsoft Word. Alternatively, when used in connection with the structure depicted in FIG. 2B handwriting recognition software might be resident in separate device 150, which might receive location signals via communications module 141. Separate device 150 may also run a word processing program or other program in which the user may edit information recorded by digital pen.

Figure 11A:
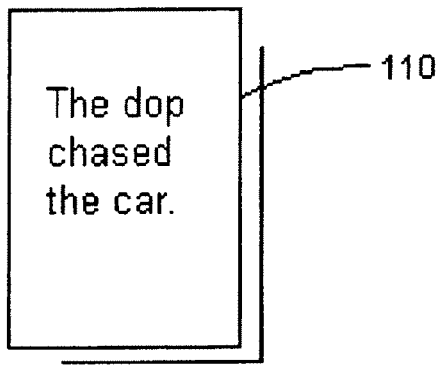
FIGS. 11A-C and 12A-C provide exemplary descriptions of data processing techniques.
Figure 11B:
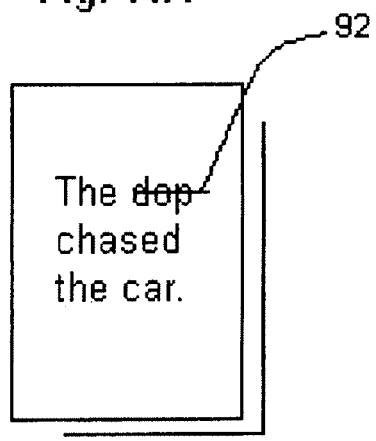
Figure 11C:
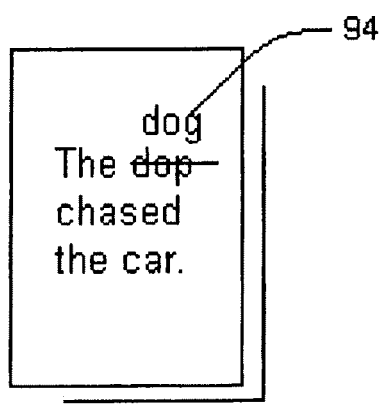

In the event a user wishes to change a word after having written it, processing module 136 may be configured to recognize editing symbols that enable correction. By way of example, in FIG. 11A, a user writes "The dop chased the car." Recognizing the error, the user strikes a line 92 through the word "dop" as reflected in FIG. 11B. The processing module 136, having already received location signals corresponding to the word "dop" recognizes strikethrough line 92 as an indication that the word "dop" is to be removed. Thereafter as is illustrated in FIG. 11C, the word "dog" is written by the user adjacent to the stricken word. Logic within processing module 136 thereby understands that the word "dog" is to be inserted in place of the deleted word "dop." A user might signify that no replacement word is to be written by tapping digital pen 101 a certain number of times over the crossed-out word immediately after the word is crossed out.

Figure 12A:
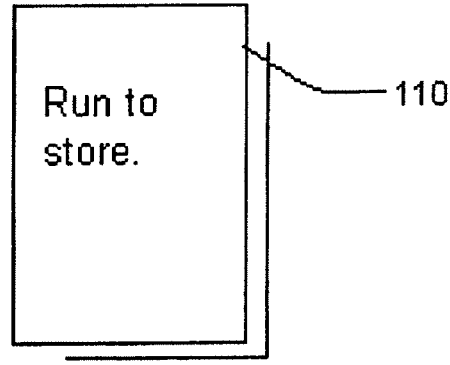
Figure 12B:
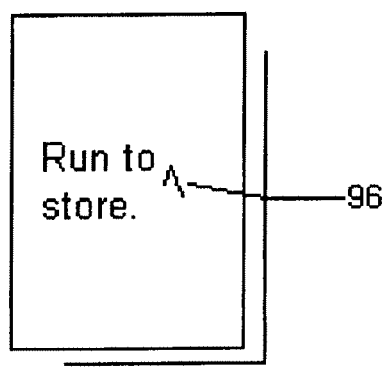
Figure 12C:
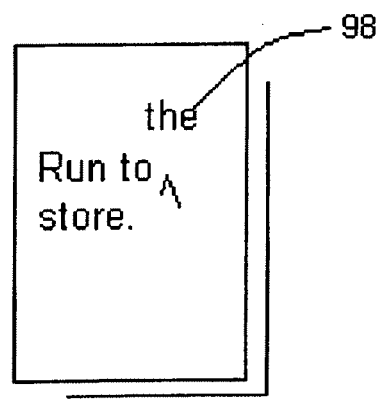

Processing module 136 may be adapted to recognize conventional proofers' marks. For example as illustrated in FIG. 12A, a user wrote "Run to store." on surface 110 using digital pen 101. Having omitted a word from the sentence, the user draws a carrot 96 after the word "to" as is illustrated in FIG. 12B. Carrot 96 signifies to the processor the user's intent to insert text. As is depicted in FIG. 12C the user then writes the word the above the carrot signifying to processor 136 to add the word "the" at the carroted location.

Processing module 136 may permit users to make corrections by speaking to the digital pen 101. If, for example, a user notes an error in a message after reviewing it on display screen 125, the user might be permitted to correct errors by placing digital pen 101 on or near the word containing the error on encoded page 110. The user might then speak the correct word into a microphone in recording module 135. Using speech recognition software, processing module 136 may correct the word appearing in the original message.

10.0 Digital Pen as Communication Device

Digital pen 101 may be used as a communication device. In the following example digital pen 101 is a streaming digital pen which is used together with a separate device 150, e.g. in the form of a mobile phone. A user may use a page in a notebook or a loose page to generate an image-based message. The page may be coded by a position-coding pattern 110, which may be dedicated to streaming applications, such that the digital pen automatically enters a streaming mode when receiving positions coded by this position-coded pattern. The notebook or loose page may include a specific page or region provided with user control areas. The control areas may also be provided on a separate card or page. Examples of control areas are: a control area for starting an image messaging application in the mobile phone, a control area for new image, one or more control areas for selecting a color to be used when rendering a pen stroke, one or more control areas for selecting a line width to be used when rendering a pen stroke, one or more control areas to be used for selecting how to send an image message and/or for actually sending the image message, e.g. by MMS or e-mail, and/or for selecting a predetermined addressee for the image message. The position data, e.g., x-y coordinates, corresponding to each of these control areas, may be stored in the mobile phone, together with instructions for actions to be taken in response to receipt of the position data.

When a user wants to create and send an image message, she may first touch a control area to open the image messaging application in the phone. When the application is opened, a new blank page may be displayed on the mobile phone display. The user may then draw or write an image or message using digital pen 101 on the encoded paper. Different control areas may be touched to qualify the pen strokes with regard to features such as color and width. The coordinates decoded from the position-coding pattern imaged by the sensor in digital pen 101 may be streamed wirelessly over a Bluetooth™ link to the phone and received in the image messaging application in the phone. The application may render the pen strokes more or less in real time on the display. Any touching of a control area by the digital pen may then be recognized by the application and the rendering on the display may then take into account the instructions associated with the control area being touched. Since the display of a mobile phone typically is rather small, the complete picture or message drawn on a notebook page may not be displayed to scale. Different zooming techniques can be used to make the displaying of the image more user-friendly. The user may save the image message using a save-image function of the phone for later use in the image messaging application or in any other phone application that uses images.

The user may also send the image as an MMS or an e-mail. To this end the user may tap an MMS or e-mail control area with digital pen 101. When the application recognizes the touching of the MMS control area, it may open an ordinary MMS application in the phone which handles the steps up to the transmittal of the image message to an indicated receiver in the corresponding way as for any other image handled by the MMS application. Likewise, when the image messaging application recognizes the touching of the e-mail control area, it may open an ordinary phone e-mail client, which incorporates the image message as an e-mail content and sends it to an indicated receiver in the corresponding way as an e-mail is ordinary handled by an e-mail client. The image may be compressed before sending, e.g. by using the JPEG standard. Different degrees of compression may be used for different kinds of message formats, transmission speeds or the like.

The user may alternatively tap a blog control area or a "favorite" control area. If the application recognizes that a blog control area is tapped by the digital pen, the image message may be sent to a predefined blog service. The blog service may be identified by an e-mail address which has been preset by the user using setting options associated with the image messaging application. If the application recognizes that the "favorite" control area is tapped by the digital pen, the image message may be sent as an email if a "favorite" address previously set by the user includes an email address, identified e.g. by a "@" sign. Otherwise, the image may be transmitted as an MMS if the address is interpretable as an MMS address.

In one embodiment a user may load a background image in the display of the phone, so that pen strokes made on a paper are rendered on the background image. The composite image may then be sent to an indicated receiver.

In another embodiment, digital pen 101 may be used to search and browse information, for instance on the Internet. A user may open a web search application in any of the ways that have been described above in connection with other applications. He may then write his search term(s) on an encoded paper. When processing module 136 receives the position data representing the search term(s), a handwriting recognition software may be used to interpret the terms. Feedback may be given audibly or visually to allow user to correct the interpretation. Processing module may then input the search term(s) in an ordinary web browser software and launch the search. Result of the search may be presented to the user visually in display 125 and/or audibly by speaker 126. When the search term(s) is written on the paper, a bounding box may be generated and stored. Tapping within the bounding box may result in that the search is repeated and an updated result presented to the user.

In yet another embodiment, user may input text by using a printed keyboard provided with a position-coding pattern. Storing module 138 in digital pen 101 or separate device 150 correlations between the positions coded by the position-coding pattern of each key on the paper keyboard and the corresponding character. When the user taps a key on the printed keyboard with digital pen 101, processing module receives position data recorded by digital pen and may convert the position data to the corresponding character by using the correlations stored in storing module 138. The printed keyboard may also be provided with user control areas representing shortcuts to different applications, e.g. shortcuts to standard applications used in mobile phones, like SMS and web browsers. The keyboard may be used for inputting text and figures in character fields in such applications. The keyboard may also be provided with blank control areas, the function of which may be defined by the user.

In yet another embodiment, user may use a text input application to input text to any application that uses text, such as SMS or e-mail. The user may write printed text by the digital pen. Control areas may be used to format the text, to qualify the text or to give indications about how the text is to be interpreted. A control area may for instance be tapped to indicate that the subsequent characters should be interpreted as digits or special symbols, to indicate that a dictionary for a specific language should be used when performing handwriting recognition, or to indicate that a previous character or word should be deleted.

11.0 User-Specific Functionality

Digital pen 101 may be specialized for use by specific classes or categories of users. In an example in which the user is a journalist, display screen 125 on digital pen 101 may display messages to remind the journalist to ask certain questions when conducting an interview. A pen used by a courier, for example, might be programmed to prompt the courier to confirm C.O.D. payment. Pens used by lawyers might be configured to audibly or visually remind the lawyer to ask certain questions of his client or a witness. In the same way, the pen might provide feedback when one or more required fields in a form remain blank.

12.0 Security Keys

Figure 6F:
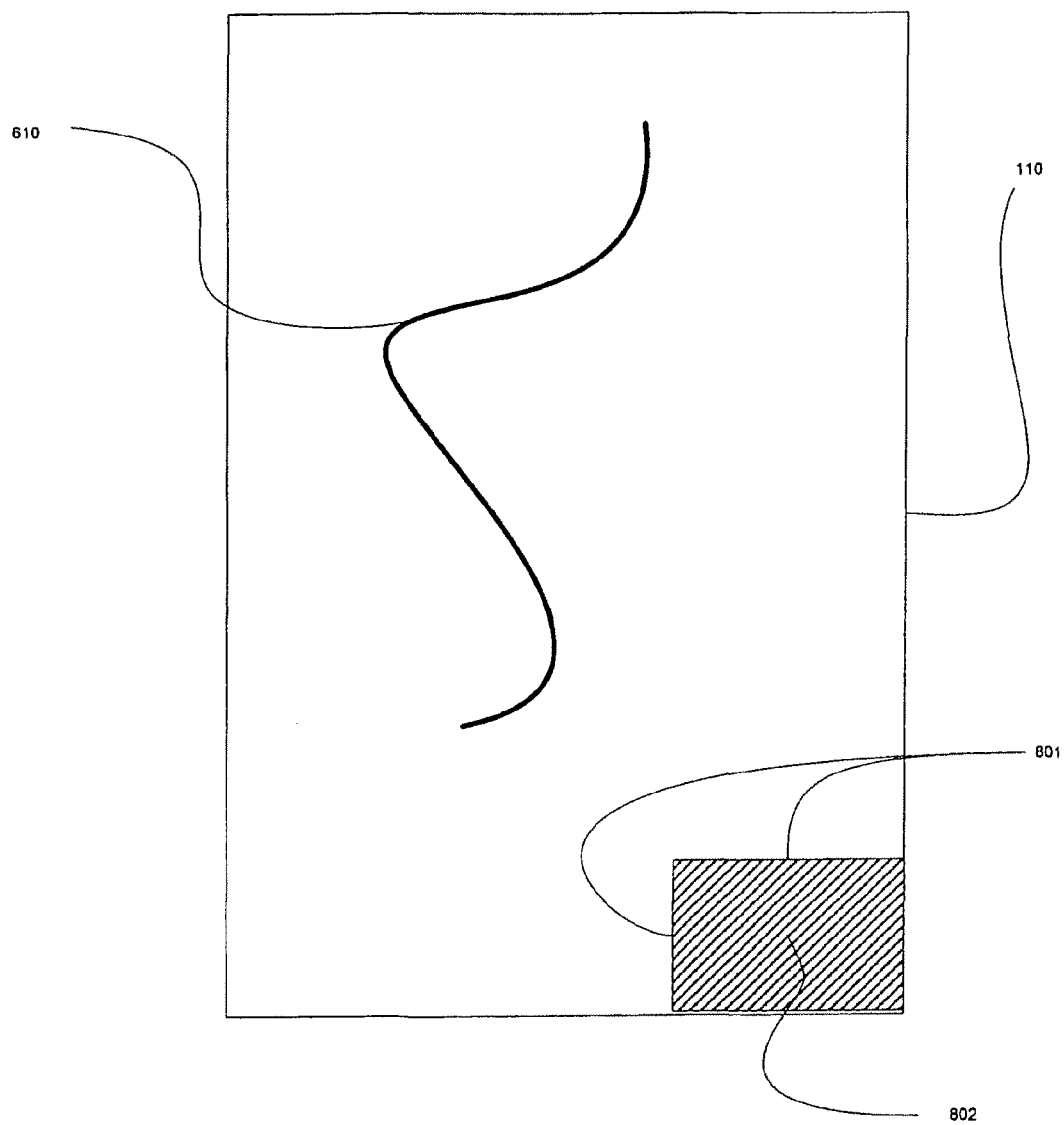
FIG. 6F depicts an exemplary security key embodiment.

FIG. 6F depicts a method of providing security for encoded surface 110. Security may be provided designating a particular portion of coded surface 110 as an "access key". A user who wishes added security might require that the access key is tapped before information may be retrieved. The access key may be a removable portion of the surface on which notes were already written, or might be printed on a card carried in the user's wallet or purse. Regardless, by separating the key from the digital pen and written notes, access to associated linked information may be controlled. To this end, and as illustrated in FIG. 6F, encoded surface 110 may include perforated tab 802 with encoding that may define an access key. In some embodiments, the encoding on perforated tab 802 may be defined by the user to correspond to security encoding, such as, for example, by drawing one or more special symbols on encoded surface 110 and/or tab 802. In some embodiments, to access the audio file correlated to mark 610, digital pen 101 may need to be placed on or near the encoding on perforated tab 802. To restrict access to the audio file associated with mark 610, the user may tear perforated tab 802 at perforations 801 and remove perforated tab 802 from encoded surface 110. In some embodiments, the security encoding may be a sticker that can be removed. In other embodiments, the portion of encoded surface 110 with a security encoding may be physically torn from encoded surface 110 without the aid of perforations.

The security encoding may never have been physically attached to the protected encoded surface 110. For example, a user may be issued an identification badge with a security encoding on it. To protect a document, the user may use digital pen 101 to draw a special symbol on encoded surface 110 to be protected and then touch the identification badge with digital pen 101. Processing module 136 will then associate protected encoded surface 110 with the identification badge. If a user thereafter desires to play media associated with mark 610, the user may then be required to place digital pen 101 on or near the identification badge to gain access to the correlated audio.

In some embodiments, a networked environment may be used to provide security using the security encoding. In an embodiment in which digital pen 101 contains communication module 140, the association between mark 610 and encoded surface 110 may be stored in central storage module 135. In some embodiments in which central storage module 135 is used to store the association between protected encoded surface 110 and the identification badge, any digital pen 101 may access central storage module 135 and be used to access the media correlated to mark 610. Multiple identification badges with the same security encoding may exist, and may be used to restrict access to correlated media to only those individuals having an identification badge with the proper encoding. The security encoding may also be used in a similar manner, prevent the correlated media from being overwritten. Security encoding may only be associated with certain portions of encoded surface 110, which may be useful in situations where only a portion of information is sensitive, or where access to portions of linked information is restricted to a subset of individuals who have access to a file. Security encoding may, for example, be associated with certain types of correlated media.

13.0 Control Using Pen Cap

Digital pen 101 may be provided by a pen cap (not shown in the drawings). The actions of taking off and putting on the pen cap may be detected by a sensor in the pen cap or in the pen. Different functionality may be associated with the taking off or putting on of the pen cap. Alternatively or in addition, pen cap may be provided with one or more encoded regions, e.g. pidgets or control areas, which may enable one or more control features to be activated when the pen tip touches such an encoded region. In doing so, sensing module is capable of detecting the encoded region, and the processing module 136 recognizes the selected position data as representing a control feature and accordingly controls functionality.

A previously recorded audio file may be provided by a third party for use with specific encoding patterns on encoded surface 110. For example, a publisher, such as a textbook manufacturer may place one or more encoded surfaces 110 in a textbook or other publication. The publisher may also provide an audio file that contains audio correlated to different encoding patterns on encoded surfaces 110 in the publication. After loading the correlations into storage module 130, a user may place digital pen 101 over or near encoded surfaces 110 in the publication so that processing module 136 may access the correlated audio.

Each of the logical or functional modules described above and/or below may comprise multiple modules. The modules may be implemented individually or their functions may be combined with the functions of other modules. Further, each of the modules may be implemented on individual components, or the modules may be implemented as a combination of components.

14.0 Display with Zooming

A user may make notes or drawings on a paper by a digital pen which electronically records the notes and/or drawings. These notes and/or drawings may be displayed on a display on the digital pen or a separate device like a mobile phone. The display may in particular be used in showing notes when a user wants to alter the digital representation of the ink, such as using different line thickness and color of the strokes. Further, in some applications, it is not desired that the digital pen leaves a trace on the paper, e.g. when the paper is to be re-used several number of times for taking notes. In such cases, it is especially advantageous to present the notes and/or drawings made with the digital pen on a display.

However, the display may often be much smaller than the paper on which strokes are drawn. Thus, it may not be possible to display the notes and/or drawings to scale.

In one embodiment a zooming function may therefore be used when displaying pen strokes. The zooming function may be performed by processing module 136 in digital pen 101 or in separate device 150. An aim of the zooming function may be to display the pen strokes that currently are of interest to the user in an appropriate scale.

The method may start with an initial scaling value, chosen based on the resolution of the digital pen and the resolution of the display, such that the user experiences e.g. a 1:1 ratio between what is drawn and what is displayed, as long as what is drawn is within a rectangle of the same size as the display.

When a first stroke is drawn, the stroke may be rendered on the display with the first position of the stroke being centered on the display. When the digital pen is lifted, the center of mass of the stroke is calculated and centered on the display.

While the digital pen is in use, the zooming function may check and if needed, update a rectangular bounding box defined by a minimum x-y coordinate and a maximum x-y coordinate of all the pen strokes making up the notes. The update may be done for each new x-y coordinate in an ongoing stroke at a time, for all x-y coordinates after a stroke, or for all x-y coordinates in a range of strokes.

The bounding box is chosen such that the aspect ratio of the bounding box is equal to the aspect ratio of the display. Thus, the strokes will not be deformed when being scaled to fit the display. This implies that the axis along which the strokes have the largest extension will define the size of the bounding box. The bounding box is preferably arranged such that the defining axis is not completely filled by the strokes, but a small gap is left at each edge of the display. This allows new strokes to be rendered on the display even if the strokes extend slightly outside the minimum or maximum x-y-coordinate of the previous strokes. Further, the bounding box may be chosen in such a way that a center of mass of the strokes, hereinafter called center of drawing, is placed in the center of the bounding box.

After each update, a scaling candidate and a center of drawing may be calculated. The scaling candidate may become the new scaling value if it is required to fit the entire drawing in the drawing plane within the limits of the display. Otherwise, the existing scaling value may be kept. However, if the strokes merely cover a part of the display, the strokes may be enlarged using a scaling value larger than 1, such that the user may see the strokes in greater detail and the entire area of the display is used.

The representation of the drawing in the display may be modified after each bounding box update, taking the scaling value and center of drawing into account. This guarantees that the entire drawing always is visible in the display.

According to an example, the bounding box may be updated after each stroke. However, while a new stroke is drawn, the stroke is rendered on the display. If the stroke exceeds the bounding box, it may trigger updating the bounding box before the stroke has been completed. Alternatively, the positions that are outside the bounding box will not be rendered until the stroke has been completed and an updated bounding box has been formed. In this alternative, if the first position of a new stroke is outside the bounding box, the bounding box may be updated using this position such that at least part of the new strokes may be rendered on the display while being drawn.

When the bounding box is updated, the drawing may be shifting position on the display. If the bounding box is frequently updated, a user may experience this as an annoying display jumping. In order to avoid display jumping with each update, it is desired that either the x- or the y-axis of the bounding box is held fixed when possible. Thus, if possible, the x- or y-axis may be held fixed, instead of the center of drawing being updated.

According to one embodiment, the direction in which the last stroke was drawn may be considered. This may be used in order to estimate a positioning of one of the axes such that this axis may be kept fixed in future strokes. For example, if the last stroke mainly displaces the center of drawing in a direction of the x-axis, it may be expected that the future strokes will also displace the bounding box in that direction. Thus, the center of the bounding box along the y-axis will be kept fixed and it may be expected that the center of the bounding box along the y-axis will not need to be altered when the next stroke(s) is drawn. Since the aspect ratio of the bounding box is to be held constant, the extent of bounding box along the y-axis will be altered as the extent of the x-axis is altered. However, keeping the center of the y-axis fixed will imply that the strokes on the display will only be slightly moved along the y-axis, if moved at all.

The thickness of a line that appears in the display may be either fixed, primarily to enhance readability, or scaled in accordance with the scaling value to render a true proportional image of the original drawing or rendered by other methods giving the user an intuitive representation of the image.

If the area taken up by the notes is much larger than the area of the display, it may, however, not be advisable to immediately scale down the notes so that all notes will fit into the display, because the scaling may make the recent notes unreadable or impossible to interpret.

In an alternative embodiment, the zooming function may be configured to display only part of the notes made on the paper when the scaling value indicates that display of all the pen strokes would mean down-scaling more than a predetermined amount. Thus, the display may suitably show part of the notes that are made in a close relation to the stroke that is currently being drawn. In this way, the display may show the pen strokes that currently are of interest to the user.

To this end, the zooming function may form a supplemental bounding box with respect to a predetermined number of recent pen strokes. If the size of the bounding box is such that the predetermined number of recent pen strokes can be displayed with less than a predetermined maximum down-scaling, these recent pen strokes may be displayed with the current scaling. If not, the zooming function may update the supplemental bounding box to include a successively reduced number of recent strokes until the recent pen strokes can be displayed with less than the predetermined maximum down-scaling.

The zooming function will thus make sure that the most recent pen stroke(s) are zoomed-in in the display and displayed with a user-friendly scaling.

Of course, the most recent pen strokes may not be the strokes that are closest to the pen stroke that is currently being drawn. Therefore, the supplemental bounding box may alternatively be formed by identifying the strokes on the paper that are close to the stroke that is currently being drawn and which may be displayed with less than the predetermined maximum down-scaling.

In one embodiment, the zooming function will zoom out after a predetermined period during which no input is received from the digital pen. Zoom-out may be performed to a state where the complete notes are displayed in the display giving an overview of the notes, even though the notes may be hard to read in this scale.

Generally, the zooming function may be described as a method of displaying strokes, while the strokes are being drawn by means of a digital pen, said method comprising: receiving positions recorded by the digital pen, while the digital pen is used to draw strokes; transferring the recorded positions to a processor that controls a display; forming a bounding box which encloses recorded positions that are close to the most recently recorded position; calculating a scaling value for fitting the bounding box to the display; and presenting the recorded positions within the bounding box on the display using the calculated scaling value.

In one embodiment, the bounding box is updated when new recorded positions are received. Thus, the display may always show the strokes in the vicinity of the most recently drawn strokes. It is likely that these strokes are the ones of interest to the user.

The zooming function may additionally or alternatively be used in a similar way when navigating on a paper in previously recorded notes which are displayed on the display. When the user taps with the digital pen on a page with notes that have already been stored in storage module 138, the complete notes may first be displayed in the display. When the user taps a different location in the notes or double taps, zooming-in on a group of pen strokes may be performed.

15.0 Exemplary Architecture of Separate Device

Figure 5:
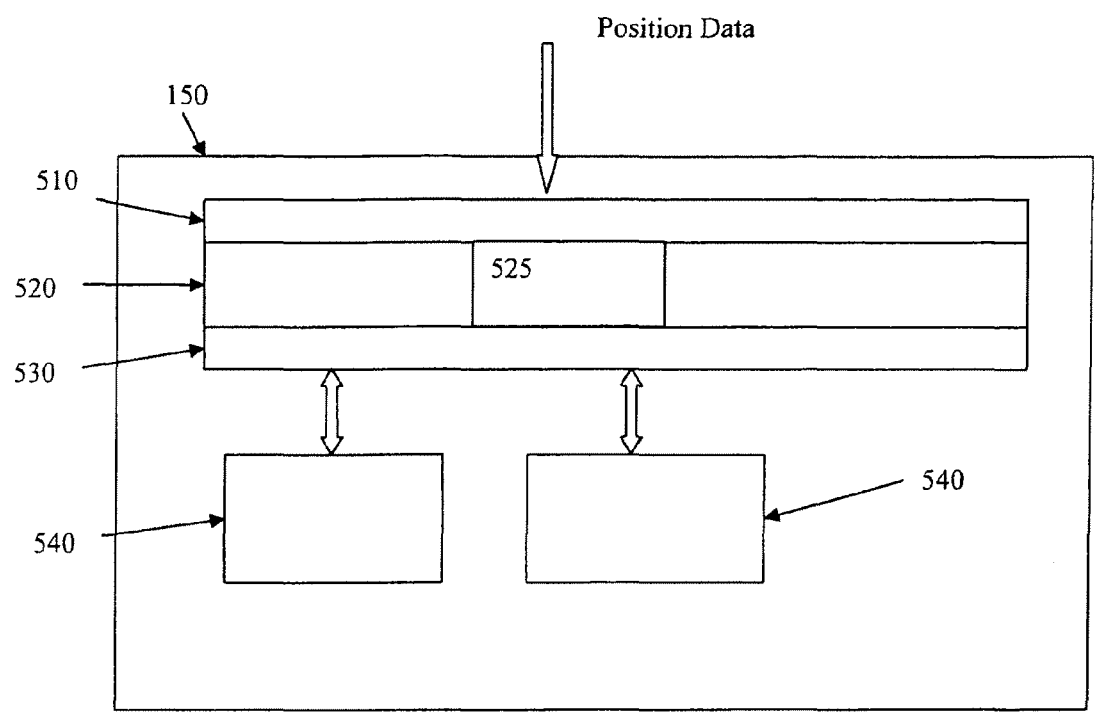
FIG. 5 depicts an exemplary architecture for processing position data, received from a pen, in a separate device.

FIG. 5 illustrates an exemplary architecture of a separate device 150 to which part of the functionality of a digital pen 101 can be "outsourced". Digital pen 101 may e.g. be a streaming digital pen or a store-and-send digital pen which sends recorded position data to a separate device 150 for further processing. Separate device may be a mobile phone or a PDA or any other appropriate device.

Separate device 150 may generally comprise a communications interface 510, a pen server 520, a client interface 530, and one or more pen clients or pen applications 540, such as for instance the Paper Replay™ application and the Image Messaging application mentioned above.

Communication interface 510, which may be a Bluetooth™ communications interface, may receive position data from digital pen 101 in accordance with a predetermined protocol. The position data may include a series of position indications and a pen up indicator. A pen down may be defined by the first position indication received. Each position indication may be represented as a page identity and a local x-y coordinate of the identified page.

Pen server 520 may comprise or be associated with a pen manager 525 which runs automatically in the background and which listens for position indications corresponding to control areas that represent an instruction from the user to start a predetermined application.

Pen server 520 directs position data received from digital pen 101 to the pen clients 540 through pen. Position data may be directed to selected pen clients or to all clients that are active. Page identity may be used as one selection criterion for routing position data.

16.0 Exemplary Navigation Controller for Digital Pen

The digital pen 101, regardless if it is implemented as a stand-alone pen or a pen working together with a separate device, may use a control icon or navigation controller such as one referred to as NavPlus™ by assignee. The NavPlus™ controller is an easy-do-draw and easy-to-remember symbol that is designed to be unique from any other purposeful or accidental marks a user may make with digital pen 101. It is furthermore designed to be easy for processing module 136 to distinguish from any other user-drawn marks. To this end the NavPlus™ controller may be shaped like a plus sign. However, other shapes and symbols may be used to achieve the same functionality as is described below for the NavPlus™ controller in the form of a plus sign. The NavPlus™ controller can be drawn by the user on paper or be pre-printed on encoded surface 110. The uses of the NavPlus™ interface include, for example: file navigation and management, application launching, application menuing, application controls, and entry of shortcuts and macros.

To create the NavPlus™ controller, the user may draw a plus sign and then double-tap in the center or at some other location. The four strokes making up the plus sign may have to be uninterrupted, e.g. if the user draws a plus sign, then writes a word, then double-taps the plus sign, a NavPlus™ controller may not be created.

Other constraints may be identified as well. Examples of such constraints may be that the two lines making up the plus sign may need to be within a maximum and minimum length, that the two lines may need to be comparable in length, that they may have to cross reasonably near their midpoints, that they need to be orthogonally aligned to the paper and/or that double-tap must occur close to the intersection of the lines.

Rules for the creation of a NavPlus™ controller may allow the lines to be drawn in any order and direction, e.g. the user could draw from top to bottom then from left to right, or they could draw from right to left then from bottom to top, but may require that the two lines must be drawn first, followed by the double-tap.

When processing module recognizes the drawing of a NavPlus™ controller, it may store position data defining the location and extent of the NavPlus™ controller on encoded surface 110. If a pre-printed NavPlus™ controller is used, information may be stored in digital pen 101 or separate device 150 or in any other appropriate device defining the location and extent of the pre-printed NavPlus™ controller.

To access an existing NavPlus™ controller on surface 110, the user may place digital pen 101 on the NavPlus™ controller, so that the position of the digital pen is recorded. Processing module 136 will recognize that the recorded position refers to a NavPlus™ controller. The NavPlus™ controller may be implemented so that its function depends on which application is running in the digital pen at the time the Nav-Plus™ controller is accessed. The NavPlus™ controller may then control features and operations within the currently active application. As an alternative the NavPlus™ controller may always operate in the same way.

A user of a NavPlus™ controller may return to the top-level of the control at any time by double-tapping in the center of an existing NavPlus™ controller. It will then be put in the same state as a newly-created NavPlus™-controller. It will for instance return to "Main Menu" or top level of a file structure.

The area belonging to the NavPlus™ controller may consist of the area of a bounding box enclosing the complete NavPlus™ shape. In the case of a plus sign, the area may consist of the orthogonal rectangle including the plus sign. All of this NavPlus™ controller area can be used for various types of controls and interactions.

16.1 Control Action Examples

Figure 13:
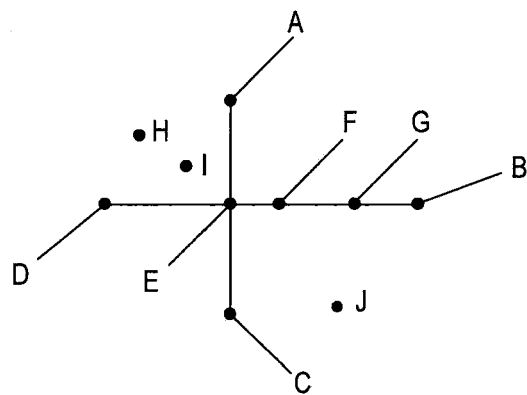
FIG. 13 further illustrates the use of the control icon of FIG. 4B.

Table 1 below summarizes how the NavPlus™ controller can be used. The letters A-J refer to different points on the NavPlus™ controller shown in FIG. 13.

TABLE 1

| | |
|---|---|
| Tap up (A) | Tap near the end of the upper axis |
| Tap right (B) | Tap near the end of the right axis |
| Tap down (C) | Tap near the bottom of the lower axis |
| Tap left (D) | Tap near the end of the left axis |
| Tap center (E) | Tap where the two lines meet |
| Double-tap (left, right, up, down, or center - same locations as above) | Double-tap in any of the previous locations |
| Tap along an axis (F, G) | Tap somewhere between the center point and the end-point. The distance along the axis could determine the relative scope of the function. |
| Drag along an axis (F to G) | Drag between two points along one of the axes, such as from F to G. The direction, length, and location of the drag could determine the effects of the function. |
| Tap at 45 degrees (H, I, J) | Tap in the areas between the axes. The quadrant tapped, the distance from center, and the relative angle from center could determine the effects of the function. |
| Complex tap | Tap in a pre-set pattern of locations, e.g. D, A, C, E, F |
| Complex drag | Drag between a pre-set pattern of locations. |

16.2 File Navigation and Application Launching

Figure 14:
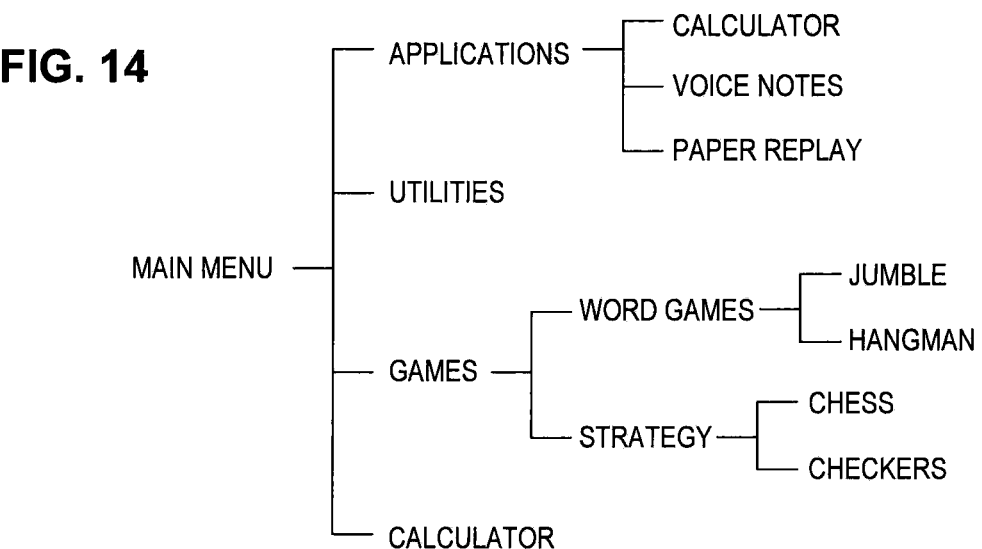
FIG. 14 shows an example of a hierarchy of user applications which may be navigated by the control icon shown in FIG. 13.

Taps on A, B, C, and D allow the user to use the NavPlus™ as a four-way controller to move around within a virtual hierarchy. For example, a user's applications might be laid out as shown in FIG. 14. When the user double-taps at the center of the NavPlus symbol, they are taken to the "Main Menu" location. From there, tap right to get to the application list, then tap up or tap down to scroll through the first level of options. To get to an item inside a folder, tap right. To go back to the enclosing folder, tap left. When an application is currently selected, tap right to launch that application. Tap center allows the user to perform other operations on the current item. It brings up a separate ("pop-up") menu with options such as "get info", "delete", "rename", and "move".

Based on the above diagram, if a user started at Main Menu and wanted to launch CHECKERS, they would perform these steps:
Tap right (Applications)
Tap down twice (Games)
Tap right (Word Games)
Tap down (Strategy)
Tap right (Chess)
Tap down (Checkers)
Tap right (launches Checkers)

A single application can appear in multiple locations in the hierarchy. In the above example, "Calculator" is listed inside the Applications folder, but is also available as the last item in the first level. This allows the user to access it more quickly.

Another method of launching an application is to invoke the NavPlus™ controller and then write the QuickLaunch name of an application. This is done by either creating a new NavPlus™ controller, or by double-tapping on an existing NavPlus™ controller, writing a QuickLaunch name, and double-tapping.

Figure 15A:
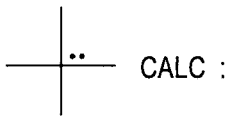
FIGS. 15A-C depict how the control icon of FIG. 13 may be used for launch of applications.
Figure 15B:
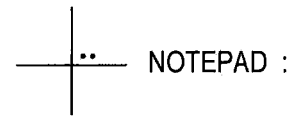

For example, if the QuickLaunch name of the Calculator application is "Calc", then writing like in FIG. 15A would launch Calculator (two dots within the controller represent a double-tap. Similarly, writing like in FIG. 15B would launch the Notepad application.

Figure 15C:
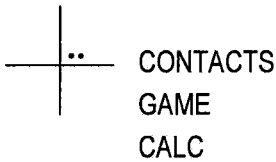

In one embodiment an existing NavPlus™ controller may be reused. FIG. 15C shows the result when a user created a NavPlus™ and launched Contacts, then later returned to double-tap the NavPlus™ and launch Game, then returned once more to double-tap the NavPlus™ and launch Calc:

16.3 Menu Navigation within an Application

Figure 16:
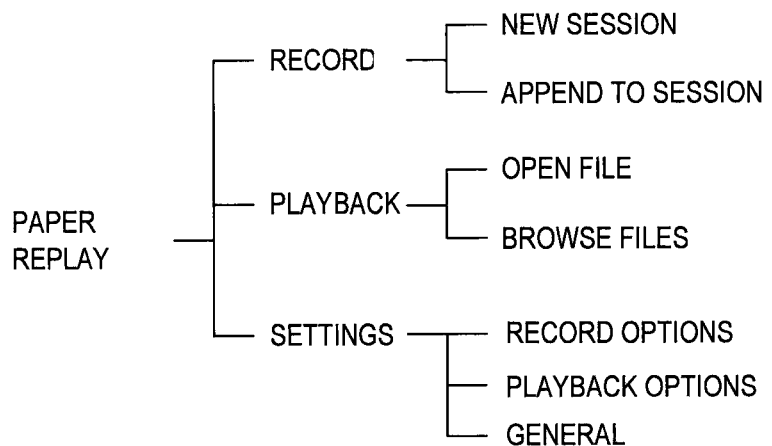
FIG. 16 shows an exemplary menu structure of a Paper Replay™ application.

Once an application has been launched, the NavPlus™ controller may be used to navigate the menu within that application. For example, the menu structure of Paper Replay™ could look like in FIG. 16.

When Paper Replay™ is first launched, it enters the root level of the menu hierarchy. From there, the user may tap right, then tap up and down to begin navigating the menu options. This hierarchy is navigated in the same way as the file navigation described above.

16.4 Controller within an Application

In certain parts of an application, the NavPlus™ controller may be used to control a set of features of the application. In this case the controller takes on different functions from the hierarchy-navigation controls described above.

When the NavPlus™ controller is working as a controller, the tap-left area is reserved to allow the user to return to the application menu structure.

Figure 17:
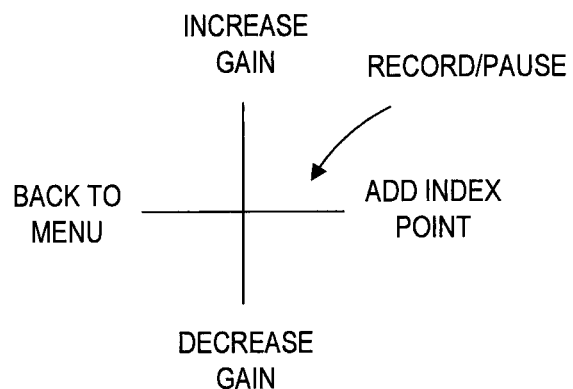
Figure 18:
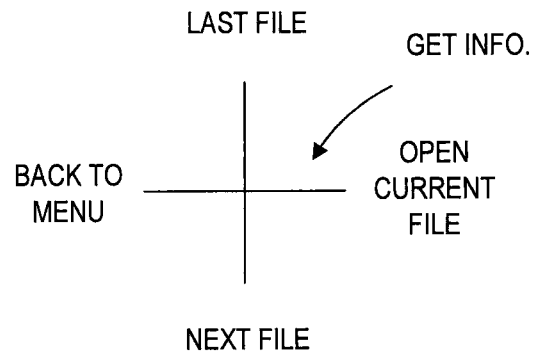

FIGS. 17-19 show three possible layouts of controllers within the Paper Replay application. The layout of FIG. 17 could be used once the user has begun recording a session in Paper Replay. The layout of FIG. 18 could be used when the user is browsing the available audio sessions. The layout of FIG. 19 could be used once the user is in the Playback mode and has selected a session for playback.

16.5 Shortcuts and Macros

The NavPlus™ controller can be used for a user to enter a series of strokes or taps that correspond to a code. This could be used for password entry or to invoke macro sequences. For example, a user could set their password to: Tap up, Tap down, Tap halfway along right access, Tap down.

An application could be written that allows users to create macros that launch applications or invoke a series of commands. The macro could be launched through a series of drags on the NavPlus™ controller. For example, the launch key could be: Pen down in the center, drag up and right along a 45-degree angle, drag left and cross through the top line, then drag down to the tap-left area.

These systems allow users to create user-defined sequences that are (a) private and (b) difficult to accidentally invoke.

16.6 Dual Controls

Figure 20A:
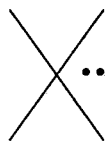
Figure 20B:
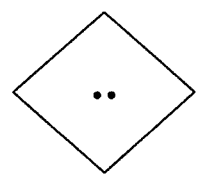

Some applications may use an alternate four-way or five-way button, similar to the main NavPlus controller, which allows users access to an additional set of features or controls. This controller would use a different shape to differentiate it from the main NavPlus controller. Some possible shapes are shown in FIGS. 20A-20C.

17.0 Summary of Some of the Concepts Described Above

Some of the concepts described above can be summarized as follows.

A control system comprising a stylus having a distal end for retaining a marking element adapted to make marks on a surface; a sensor configured to detect positions of the distal end of the stylus relative to the surface as the marking element is moved relative to the surface, and to generate location signals reflective of positions of the distal end of the stylus relative to the surface; a memory location for storing contour information identifying parameters of a variable control icon, the variable control icon defining at least one variable control region for enabling variable control adjustments; and a processor for comparing the location signals with the control icon contour information and for storing in memory control region information reflecting a position on the surface where the stylus was used to draw a variable control icon; wherein the processor is further adapted to output a control signal when the distal end is detected by the sensor to be in proximity to the variable control region, the value of control signal varying as function of a position of the sensor within the variable control region. The control signal may e.g. modulate playback of a recording.

A method of outputting control signals based on input associated with a position of a stylus relative to a surface may be seen as comprising receiving location signals reflective of positions of a distal end of the stylus relative to the surface; analyzing the location signals to identify the invocation of a variable control icon, the variable control icon defining at least one variable control region for enabling variable control adjustments, wherein positions within the variable control region correspond to differing control signal values; and determining, upon invocation of the variable control icon, a position of the distal end within the variable control region; and generating a control signal having a value that is a function of the determined position of the distal end within the variable control region. The method may be implemented in a processor.

A data capture system, comprising: a stylus having a distal end for retaining a marking element adapted to make marks on a surface; a sensor configured to detect positions of the distal end of the stylus relative to the surface as the marking element marks the surface, and to generate location signals reflective of positions of the marking element relative to the surface; a data input module for receiving information relating to the location signals; and at least one processor for correlating the location signals with the information relating to the marks on the surface.

The data capture system as described above, wherein the information relating to the marks contains audio, and wherein the processor is adapted permit variable control of audio playback as function of a detected position of the sensor relative to a variable control icon on the surface.

A control device, comprising a stylus having a distal end for retaining a marking element adapted to make marks on a surface; a sensor configured to detect positions of the distal end of the stylus relative to the surface, and to generate location signals reflective of positions of the marking element relative to the surface; memory for storing a data tag symbol definition; and at least one processor for determining when location signals correspond to the data tag symbol definition, and for tagging data regions associated with each identified data tag symbol, the at least one processor being configured to index the tagged data regions thereby enabling a user to sequentially recall information associated with a plurality of tagged data regions.

The control device described above, wherein the processor is configured to recall information from tagged data regions when the sensor is positioned proximate a data tag symbol drawn on the surface.

A data processing system, comprising: a stylus having a distal end for retaining a marking element adapted to make marks on a surface; a sensor associated with the stylus, the sensor configured to detect positions of the distal end of the stylus relative to the surface and for generating location signals reflective of positions of the marking element relative to the surface; and a communications module within the stylus, the communications module adapted to transmit the location signals to a separate portable device having a processor, such that the separate portable device processes the location signals and provides at least one of audible and visual output.

The data processing system described above, wherein the remote device is at least one of a mobile phone and a PDA.

The data processing system described above, wherein the remote device includes an audio speaker and the output includes speech synthesis.

The data processing system described above, wherein the remote device includes a display, and wherein the output includes text presented on the display.

A word processing system, comprising a stylus having a distal end for retaining a marking element adapted to make marks on a surface; a sensor associated with the stylus, the sensor configured to detect positions of the distal end of the stylus relative to the surface and for generating location signals reflective of handwriting on the surface; and a processor configured to receive a first set of location signals and to interpret the first set of location signals as text, the processor further configured to receive a second set of location signals and to interpret the second set of location signals as an instruction to modify the text.

The word processing system above, wherein the processor is further configured to receive a third set of location signals and to modify the text in accordance with the third set of location signals.

A system for organizing information associated with the use of a digital pen, the system comprising a stylus having a distal end for retaining a marking element adapted to make marks on a surface; a sensor configured to detect positions of the distal end of the stylus relative to the surface as the marking element marks the surface, and to generate marking signals reflective of positions of the marking element relative to the surface; memory for storing surface identifying information; and at least one processor for using the surface identifying information to determine an identity of the surface on which the marks were made, the processor being configured to collect and store in one file information sharing a common surface identity.

The system as described above, wherein multiple physical surfaces share a common surface identity.

A system for organizing information associated with the use of a digital pen, the system, comprising a stylus having a distal end for retaining a marking element adapted to make marks on a surface; a sensor configured to detect positions of the distal end of the stylus relative to the surface as the marking element marks the surface, and to generate marking signals reflective of positions of the marking element relative to the surface; and at least one processor for time-stamping marking signals, the processor being configured to collect and store in one file information sharing proximate time stamps.

The system of as described above, wherein the at least one processor is adapted to divide marking signals into multiple sessions.

The system as described above wherein the multiple sessions are at least one of contiguous audio or video recording sessions.

A method of linking multiple data files captured at a single event, the system comprising processing a first data file containing first information captured at the event; processing a second data file containing second information captured at the event; identifying at least one reference point common to the first data file and the second data file; and synchronizing the first data file and the second data file based on the common reference point.

The method described above, wherein at least one of the first and second data files are captured using a digital stylus.

The method described above, wherein the at least one reference point is common frequency pattern A feedback system, comprising a stylus having a distal end for retaining a marking element adapted to make marks on a surface; a sensor associated with the stylus, the sensor configured to detect positions of the distal end of the stylus relative to the surface and for generating location signals reflective of positions of the marking element relative to the surface; and a processor for interpreting location signals and for providing a user with sensory feedback as a function of the location signals interpreted, the sensory feedback prompting the a user of the stylus to make additional marks with the stylus.

The feedback system described above, wherein the sensory feedback includes at least one of audio and displayed text.

The feedback system described above, wherein the sensory feedback is calculated to remind the user to include specific categories of information in notes written with the stylus.

The feedback system described above, further including an occupation-specific program running in the processor, the sensory feedback thereby prompting a user of the stylus to gather information associated with the occupation.

The feedback system described above, wherein the surface includes a form, and the feedback system prompts the user to fill-in information missing from at least one field in the form.

A method of associating multiple data sets for access using a digital stylus, the method comprising inserting a first index into a first data file; inserting a second index into a second data file; and associating the first index and the second index with a location on a surface, to thereby enable a user of the digital stylus to recall information from at least one of the first data file and the second data file.

A method of associating a data file with a pre-printed publication, the method comprising associating a marker with a location in the pre-printed publication; associating at least one data file with the marker; and enabling access to the at least one data file when the digital stylus detects the marker in the printed publication.

A method of forming a data set using a digital stylus, the method comprising: opening a file; associating a file association mechanism with the file, the association mechanism being activatable by the digital stylus; populating the file by activating the association mechanism using the digital stylus and capturing with the digital stylus information for inclusions in the file; recalling at least a portion of the file contents by controlling the digital stylus.

The method described above, wherein the recall mechanism is position information associated with a surface, and wherein recalling occurs by sensing the position information using the stylus.

The method describe above, wherein at least one of the first and second data files are captured using a digital stylus.

The method describe above, wherein the at least one reference point is common frequency pattern.

An electronic writing implement, comprising housing for containing a marking element; a sensor, at least a portion of which is contained within the housing, the sensor being adapted to detect movement of the marking element relative to a writing surface; a processor for receiving information from the sensor, the processor adapted to run handwriting recognition software; and a display on the housing, the display being connected to the processor and being adapted to display out from the handwriting recognition software.

A control code is contained on a pen cap and readable by a digital pen.

A hand-drawn control symbol permits a user to exercise variable control in a digital pen system by touching a digital pen to various portions of the hand-drawn control.

The invention described above wherein the hand drawn control symbol is a plus sign.

Aspects of the invention involve systems, methods, and structures for linking differing information, so that access to one category of information provides access to another correlated category of information. The invention may further involve systems, methods, and structures for facilitating access to recorded information, and for indexing, retrieving, layering, editing, organizing, using, and/or manipulating linked data.

The present invention may permit the synchronization of media recorded from different sources. For example, when a lecture is recorded in both handwriting and audio, the invention may enable notes to be synchronized with an audio file. When a lecture is captured in audio files by two or more users, the invention may enable two audio recordings to be synchronized.

Once synchronized, to facilitate access to recorded media, aspects of the invention may permit users to draw controls on an encoded surface and use these drawn controls to manipulate different types of recorded data and different recording devices. For example, hand-drawn controls may be used to initiate record, play, fast-forward, and skip-back functions. Controls drawn by a user may be simplified marks or symbols, "variable control icons" that can be accessed after being drawn to provide variable control and variable manipulation of stored information.

Depending on intended use, the invention may involve layering techniques. For example, different types of media that each contains information related to a topic might all be linked together. Multiple conference attendees could have their notes linked together, while also being synchronized to a video recording of the conference.

The present invention may include a display screen, either directly on a digital pen or on a remote device associated with the digital pen, which may be used to display information. The display may be used to reflect information about current audio or video being played back, or may provide other information about linked or synchronized data. The display may also be used to provide other feedback to the user or to prompt the user to take certain actions, ask specific questions, or to provide other reminders. The display may also be used to display handwritten/drawn information, optionally using zooming functions.

The present invention may include a pen with a communications module for communicating with other devices. For example, instead of, or in addition to, providing a display screen on the pen, the pen might communicate with another device containing a display. For example, the communications module may be used to communicate with a mobile phone, a PDA, or other transportable device. In this way, feedback from the pen can be provided through the associated device. Additionally, processing requirements may be "outsourced" from the pen to the remote device, enabling the pen to be smaller and less expensive.

Aspects of the invention may permit transmission and editing of recorded data. For example, the invention may employ a pen with an optical sensor that can be used to capture marks made on an encoded surface, together with a communications module and a processor In some embodiments of the invention, the processor may be capable of running handwriting recognition software. Using the handwriting recognition software, the processor might then interpret the captured markings and turn the markings into an electronic message to be sent by via a communications module. Some embodiments of the present invention include a spell checking feature to assist the user in composing messages. The user may be able to correct mis-spelled words by speaking the correct word into a microphone to be recognized by speech-recognition software in the processor, or by making hand-edits on a coded surface. Aspects of the invention may relate to the generation and transmittal of an image-based message using a digital pen.

Other aspects of the invention may include translation capabilities for translating recognized handwriting from one language into a message in another language.

The invention may permit recorded data to be accessed using differing criteria. For example, data may be accessed according to the data session in which the data was recorded; the physical location of markings correlated to the recorded data; or the encoding pattern on an encoded surface.

The present invention might also permit access data according to the speaker of audible data. Voice recognition capabilities can be used for determining the vocal characteristics of a speaker and thereafter searching to find all occurrences of speech by that individual.

In addition, the invention might permit access to data according to key words or phrases. For example, a user might use a microphone to record a word or phrase, and a processor might then search one or more data files for that spoken word or phrase. Alternatively or in addition, the user could use the pen to write a word or phrase that the processor could then interpret and use as the basis for a text-based search.

Some aspects of the invention may limit access to recorded data for security purposes. For example, an encoded page may include a perforated tab with security encoding on it. Before a sensing device will play back audio correlated to markings on the encoded page, it may be required that the sensing device detect the encoding on the perforated tab. Accordingly, the user might protect the audio associated with the encoded page by tearing off and removing the perforated tab.

Aspects of the invention permit recorded data to be correlated with written data using pre-defined regions on an encoded surface and time stamps. When the writing device detects a new region, the processor might time stamp the region. Thereafter, the time stamps of the regions may be used as indices into data being simultaneously recorded by a recording device. Using these indices, the processor can replay the audio correlated to the notes taken on an encoded surface.

Although the foregoing description of exemplary embodiments sometimes uses a short-hand of describing a single system, device, or method, the invention is intended to include the systems, methods and devices in which each described invention operates. In addition, various inventive features are grouped together in a single embodiment for purposes of streamlining the disclosure. This method of disclosure is not to be interpreted as reflecting an intention that the claimed invention is limited to the particular embodiments described. Rather, it is contemplated that the invention may embody individual described features, either alone or in combination with other described features. In addition, other embodiments of the invention will be apparent to those skilled in the art from consideration of the specification and practice of the invention disclosed herein. It is intended that the specification and examples be considered as exemplary only.

The invention claimed is:

1. A method for recalling media based on handwritten notes,
    electronically recording handwritten notes made on a surface, said handwritten notes comprising at least one pen stroke which is recorded as a series of position indications,
    identifying a plurality of bounding areas on the surface, each of said bounding areas including at least a part of said at least one pen stroke,
    electronically recording a further position indication relating to the handwritten notes when media is to be recalled
    determining with which bounding area said position indication is associated, and
    recalling a part of previously stored media, said part being selected based on the bounding area with which said position indication is associated.

2. The method as claimed in claim 1, wherein identifying a plurality of bounding areas comprises generating bounding areas around parts of the pen stroke depending on the development of the pen stroke.

3. The method as claimed in claim 2, wherein the bounding areas are dynamically defined as the handwritten notes are made.

4. The method as claimed in claim 2, wherein generating bounding areas comprises initializing a bounding area at a point in the pen stroke and expanding the bounding area until it has reached a predetermined size.

5. The method as claimed in claim 2, wherein generating bounding areas comprises initializing a bounding area at a first point in the pen stroke and completing the bounding area at a second point in the pen stroke, which second point is reached after a predetermined time period.

6. The method as claimed in claim 4 or 5, further initializing a next bounding area if a time difference between the recording of two succeeding position indications exceeds a predetermined value.

7. The method as claimed in claim 4 or 5, further initializing a next bounding area if the distance between two succeeding position indications exceeds a predetermined value.

8. The method as claimed in claim 1, wherein identifying a plurality of bounding areas comprises defining a plurality of predetermined bounding areas on the surface, which predetermined bounding areas have a predetermined fixed relation to the surface, and identifying which of said predefined bounding areas are contacted by the at least one pen stroke.

9. The method as claimed in claim 1, further comprising assigning a time stamp to each of the identified bounding areas and using said time stamp to recall the media.

10. The method as claimed in claim 1, further comprising presenting the media to be recalled simultaneously with the electronic recording of the handwritten notes.

11. The method as claimed in claim 1, further comprising recording media to be recalled simultaneously with the electronic recording of the handwritten note.

12. The method as claimed in claim 11, wherein the recording of media is started in response to the receipt of a position indication from a predetermined field on the surface.

13. The method as claimed in claim 1, wherein the media to be recalled is one of a group consisting of audio media, video media, presentation slides and the handwritten notes.

14. The method as claimed in claim 1, further comprising converting the electronically recorded handwritten notes to printed characters using handwriting recognition software and displaying the printed characters when recalling media.

15. The method as claimed in claim 1, wherein the handwritten note is electronically recorded from a surface provided with a position-coding pattern, which codes coordinates of positions on the surface.

16. The method as claimed in claim 1, further comprising enabling recall of media when a position indication from a predetermined part of the surface has been recorded or when position indications representing a predetermined symbol has been recorded, or when a predetermined keyword has been received.

17. The method as claimed in claim 1, wherein recalling of media comprises recreating the handwritten notes on a paper or display based on said series of positions.

18. A computer program product stored in a computer readable medium for recalling media based on handwritten notes, said computer program product comprising instructions implementing a method comprising
receiving electronically recorded handwritten notes made on a surface, said handwritten notes comprising at least one pen stroke which is recorded as a series of position indications,
identifying a plurality of bounding areas on the surface, each of said bounding areas including at least a part of said at least one pen stroke,
receiving a further electronically recorded position indication relating to the handwritten notes when media is to be recalled
determining with which bounding area said position indication is associated, and
recalling a part of previously stored media, said part being selected based on the bounding area with which said position indication is associated.

19. A system for recalling media based on handwritten notes, comprising
a stylus having a distal end for retaining a marking element adapted to make marks on a surface,
a sensor, configured to detect positions of the marking element of the stylus relative to the surface as the marking element marks the surface and to generate position indications reflective of positions of the marking element relative to the surface;
a processor, which is configured to identify a plurality of bounding areas on the surface based on position indications generated by the sensor when handwritten notes are made on the surface, said handwritten notes comprising at least one pen stroke and each of said bounding areas including at least a part of said at least one pen stroke,
said processor being further configured to receive a further position indication when media is to be recalled, to determine to which bounding area said position indication belongs, and to recall a part of previously stored media based on the bounding area with which said position indication is associated.

20. The system as claimed in claim 19, wherein the system is included in a stand-alone device.

21. The system as claimed in claim 20, wherein the system is included in a digital pen.

22. The system as claimed in claim 19, wherein the processor and the sensor are included in physically separate devices.

23. The system as claimed in claim 22, wherein the processor is included in a device from the group consisting of a mobile phone, a PDA, a computer, an audio player and a video player.

24. The system as claimed in claim 22, wherein the sensor is configured to send the position indications to the processor in a streaming mode.

25. The system as claimed in claim 22, wherein the sensor is configured to store the position indications and to send them to the processor when prompted to by a user.

26. The system as claimed in claim 19, further comprising a data input module for recording media to be recalled.

27. The system as claimed in claim 19, further comprising at least one of a media recorder, an audio speaker and a display.

28. The system as claimed in claim 19, further comprising a base, said surface being a position-coded surface of said base.

29. The system as claimed in claim 28, wherein the base is a form and wherein said surface is further provided with human-understandable information.

30. A method for recalling media based on handwritten notes, comprising
storing an indication of the locations of a plurality of bounding areas on a surface, each bounding area indicating a part of a surface that was touched by a pen stroke when said handwritten notes were made on the surface,
storing media which relate to said handwritten notes,
receiving a position indication relating to the handwritten notes when media is to be recalled,
determining with which bounding area said position indication is associated, and
recalling a part of the previously stored media, said part being selected based on the bounding area with which said position indication is associated.

* * * * *